United States Patent
Lee

(10) Patent No.: US 10,862,368 B2
(45) Date of Patent: Dec. 8, 2020

(54) BRUSHLESS DIRECT CURRENT VIBRATION MOTOR HAVING COGGING PLATES FOR OPTIMIZED VIBRATIONS

(71) Applicant: Sang-eui Lee, Jinju-si (KR)

(72) Inventor: Sang-eui Lee, Jinju-si (KR)

(*) Notice: Subject to any disclaimer, the term of this patent is extended or adjusted under 35 U.S.C. 154(b) by 115 days.

(21) Appl. No.: 16/314,944

(22) PCT Filed: Jul. 18, 2017

(86) PCT No.: PCT/KR2017/007700
§ 371 (c)(1),
(2) Date: Jan. 3, 2019

(87) PCT Pub. No.: WO2018/016839
PCT Pub. Date: Jan. 25, 2018

(65) Prior Publication Data
US 2019/0312483 A1    Oct. 10, 2019

(30) Foreign Application Priority Data

Jul. 19, 2016  (KR) .................. 10-2016-0091664
Jul. 19, 2016  (KR) .................. 10-2016-0091665
Jul. 20, 2016  (KR) .................. 10-2016-0091794

(51) Int. Cl.
*H02K 7/06*    (2006.01)
*H02K 11/215*   (2016.01)
(Continued)

(52) U.S. Cl.
CPC ............... *H02K 7/063* (2013.01); *H02K 1/14* (2013.01); *H02K 1/27* (2013.01); *H02K 3/28* (2013.01);
(Continued)

(58) Field of Classification Search
CPC . H02K 1/14; H02K 1/27; H02K 11/20; H02K 11/215; H02K 11/30; H02K 29/00; H02K 2211/03; H02K 2213/03
(Continued)

(56) References Cited

U.S. PATENT DOCUMENTS 6,836,039 B2 * 12/2004 Choi .................... H02K 5/1677
                                                        310/81
7,615,901 B2 * 11/2009 Park ...................... H02K 7/063
                                                       310/208
(Continued)

FOREIGN PATENT DOCUMENTS

CN            1512646 A     7/2004
CN        2009-62548 Y     10/2007
(Continued)

OTHER PUBLICATIONS

International Search Report dated Oct. 20, 2017 for International Application No. PCT/KR2017/007700; 4 Pages.

*Primary Examiner* — Tulsidas C Patel
*Assistant Examiner* — Rashad H Johnson
(74) *Attorney, Agent, or Firm* — Daly Crowley Mofford & Durkee, LLP

(57) ABSTRACT

Disclosed is a brushless DC vibration motor. An eccentric weight of a rotor is securely sandwiched between a back yoke and a permanent magnet, being heavier to provide an increased vibrational force. A bearing coupling portion with upper and lower stopping protrusions prevents detachment of a bearing. A bracket is formed with grooves, instead of through holes, to strongly support a cogging plate of which pieces are connected with each other to form a single body for easy-placement on the bracket. An optimized area of the cogging plate can suppress the rotor not to rise during starting of the motor, resulting in no frictional noise, and a high stopping speed and uniform horizontal level of the rotating rotor.

20 Claims, 15 Drawing Sheets

(51) Int. Cl.
*H02K 11/33* (2016.01)
*H02K 5/24* (2006.01)
*H02K 7/08* (2006.01)
*H02K 7/00* (2006.01)
*H02K 3/28* (2006.01)
*H02K 5/04* (2006.01)
*H02K 1/14* (2006.01)
*H02K 1/27* (2006.01)
*H02K 29/00* (2006.01)
*H02K 11/20* (2016.01)

(52) U.S. Cl.
CPC ............... *H02K 5/04* (2013.01); *H02K 5/24* (2013.01); *H02K 7/00* (2013.01); *H02K 7/088* (2013.01); *H02K 11/20* (2016.01); *H02K 11/215* (2016.01); *H02K 11/33* (2016.01); *H02K 29/00* (2013.01); *H02K 2211/03* (2013.01); *H02K 2213/03* (2013.01)

(58) Field of Classification Search
USPC .................................. 310/12.14, 25, 26, 51
See application file for complete search history.

(56) References Cited

U.S. PATENT DOCUMENTS

| | | | |
|---|---|---|---|
| 8,106,552 B2* | 1/2012 | Kim | .................. H02K 23/04 310/81 |
| 8,222,782 B2* | 7/2012 | Saito | ..................... H02K 7/063 310/68 B |
| 2004/0084980 A1* | 5/2004 | Yamaguchi | ............ H02K 7/063 310/81 |
| 2004/0135444 A1 | 7/2004 | Choi et al. | |
| 2006/0028077 A1* | 2/2006 | Yamaguchi | ............ H02K 11/33 310/81 |
| 2015/0288248 A1* | 10/2015 | Yamaguchi | ............ H02K 7/063 310/81 |

FOREIGN PATENT DOCUMENTS

| | | |
|---|---|---|
| JP | 2006-068593 A | 3/2006 |
| JP | 2009-022135 A | 1/2009 |
| JP | 2009-130969 A | 6/2009 |
| KR | 10-2007-0021956 A | 2/2007 |
| KR | 10-2009-0056330 A | 6/2009 |
| KR | 10-1406207 B1 | 6/2014 |
| KR | 10-1586355 B1 | 1/2016 |
| KR | 10-1707112 B1 | 2/2017 |

* cited by examiner

FIG. 5
(A)
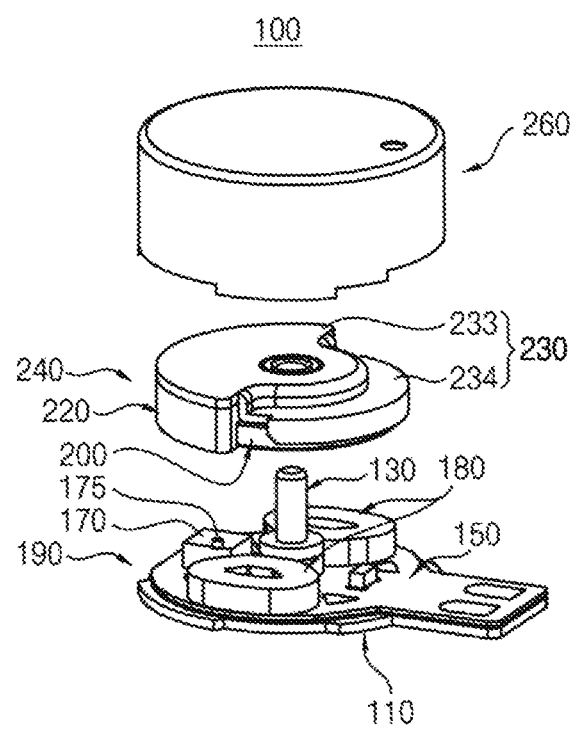
(B)
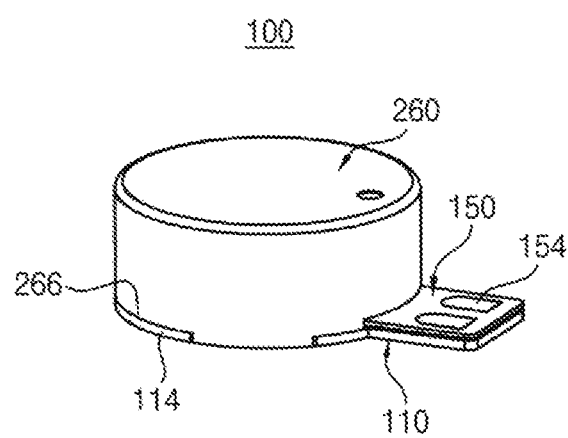

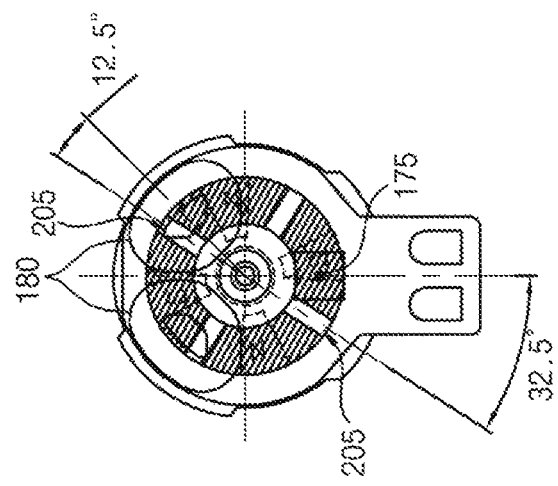
FIG. 15
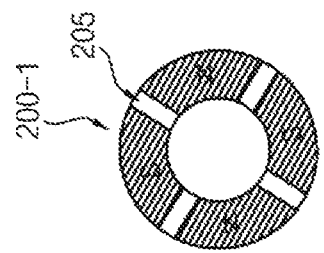
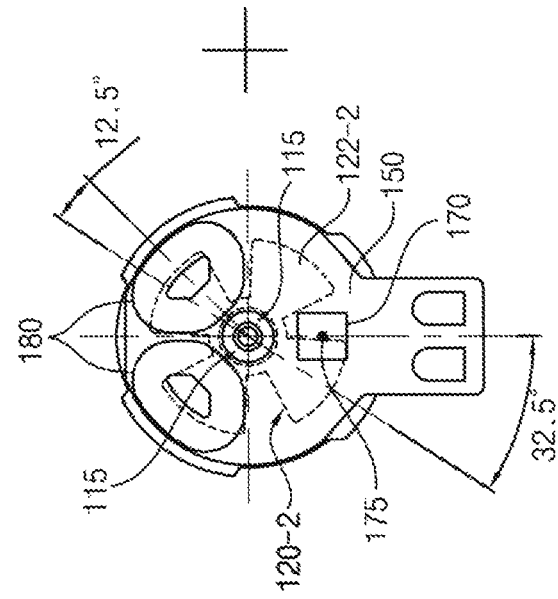

FIG. 16
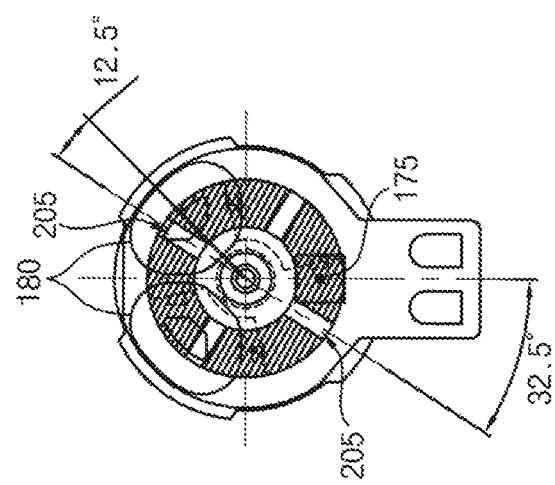
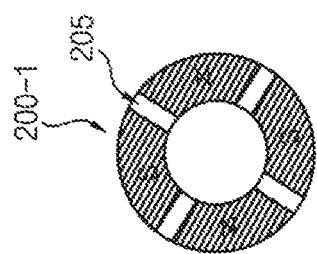
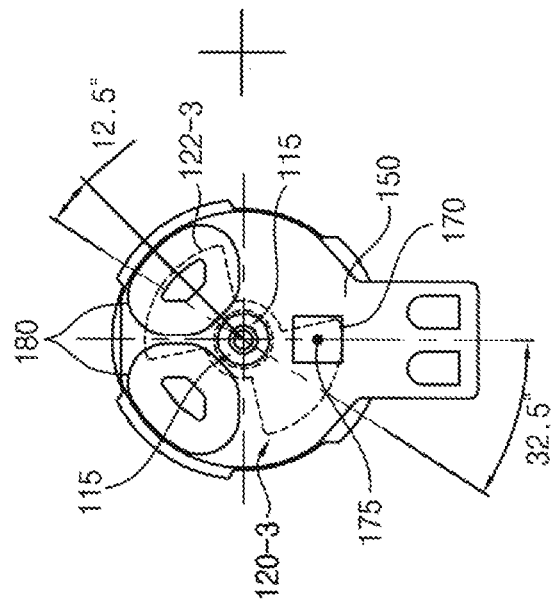

BRUSHLESS DIRECT CURRENT VIBRATION MOTOR HAVING COGGING PLATES FOR OPTIMIZED VIBRATIONS

CROSS-REFERENCE TO RELATED APPLICATION

This application is a U.S. National Stage Application of International application No. PCT/KR2017/007700 filed on Jul. 18, 2017 and published in Korean as WO2018/016839 A1 on Jan. 25, 2018. This U.S. non-provisional application claims priorities under 35 USC § 119 from Korean Patent Application Nos. 10-2016-0091664 and 10-2016-0091665 filed on Jul. 19, 2016, and Korean Patent Application No. 10-2016-0091794 filed on Jul. 20, 2016 in the Korean Intellectual Property Office (KIPO), the disclosures of which are hereby incorporated by reference in their entirety.

BACKGROUND

1. Technical Field

The present invention relates to a vibration motor, and more particularly, to a brushless direct current (BLDC) vibration motor suitable for being applied to the small electronic devices such as mobile phones, portable game machines, earphones, wearable devices, etc.

2. Discussion of the Related Art

In recent years, various functions necessary for the user's convenience have been continuously introduced in the smart phone market. In order to install the parts for the functions in a limited space, miniaturization of the parts is required. A mobile communication terminal such as a mobile phone, a pager, or the like may employ a vibration motor as means for informing a user of calling signal reception. The vibration motor has been used in various fields requiring vibration. For example, the vibration motor has been employed as a part of an electronic game machine for enhancing a reality effect of a game. Recently, it has been used as an alarm means in the earphone or various user's neck-wearable electronic devices. In these various electronic devices, one of the major issues is miniaturization. Thus, vibration motors employed in these devices have been also continuously demanded for miniaturization.

The vibration motor, which is a representative example of the vibration means, generates vibrations by converting electrical energy into mechanical energy based on a principle of generating an electromagnetic force. FIGS. 1 and 2 are an exploded perspective view and a cross-sectional view of a BLDC vibration motor 10 proposed by Korean Patent No. 10-1406207.

The BLDC vibration motor 10 may include a rotor 40 that rotates at a high speed while being driven, a stator 50 that supports rotation of the rotor 40 without rotating by itself, and cases 12 and 36 for housing the rotor 40 and the stator 50.

An upper case 12 covers and is coupled with a substantially disc-shaped bracket 36 provided as the lower case. Thus the case may provide a space for accommodating the rotor 40 and the stator 50 therein. A shaft fixing portion 38 is formed at the center of the bracket 36 and formed with a shaft coupling hole through which a shaft 26 of the stator 50 is vertically press-inserted. Through holes 37 are formed around the shaft fixing portion 38. Cogging plates 34 are placed in the through holes 37.

The rotor 40 has a structure in which a magnet 22 is attached to the bottom surface of a back yoke 16, and an eccentric weight 20 of a high specific gravity is attached to the outer side of the magnet 22 and the bottom surface of the back yoke 16. And a bearing 18 is press-fitted into a bearing coupling hole 17 provided in a bearing coupling portion 19 at the center of the back yoke 16. The rotor 40 is assembled in one body, and rotatably coupled to the stator 50.

The stator 50 may include a printed circuit board (PCB) 32, a driving integrated circuit (IC) 30, a coil 28, a shaft 26, and one or more cogging plates 34. In an example embodiment, the cogging plates 34 may be made of a magnetic material and be inserted into the through holes 37 provided in the bracket 36. In order to improve a rotation torque of the rotor 40 as well as the performance of the rotor 40 during initial start of the rotor 40, the cogging plates 34 can generate a cogging torque and interact with the magnet 22 of the rotor 40 so that the rotor can be stopped at a specific position.

One or more coils 28, preferably two to four coils 28 and a driving IC 30 to generate electric power may be mounted on a PCB 32 which is provided with a shaft through hole 39 at the center thereof. The driving IC 30 may have a Hall sensor. The PCB 32 may be attached to the upper surface of the bracket 36 by means of an adhesive means such as an adhesive or an adhesive tape. The PCB 32 may extend to the outside of the upper case 12 so that electrodes 33 formed at an extended end of the PCB 32 can be easily connected to an external power source. The shaft 26 may pass through the shaft through hole 39 formed in the PCB 32 and be inserted into and fixed to a shaft coupling hole of the shaft fixing portion 38 which may be provided at the center of the bracket 36. Assembling of the stator 50 may be completed like this.

The shaft 26 of the stator 50 may be inserted into the bearing 18 of the rotor 40 so that the rotor 40 is rotatably coupled with the stator 50. Also, washers 24 may be fitted to the upper and lower portions of the shaft 26, respectively, so that the rotor 40 is forced to rotate within a certain height range.

The upper case 12 configured to protect the stator 50 and the rotor 40 components is assembled with the bracket 36. The stator 50 and the rotor 40 in an assembled state are housed in the upper case 12. A sliding film or a washer 14 may be applied to the inner center of the upper case 12 to prevent frictional noises during rotation.

In the magnet 22 of the rotor 40, the N pole and the S pole are alternately arranged along the lower circular surface (that is, the circular surface facing the side of the coil 28) so that magnetic fields are correspondingly distributed. A driving power source for the vibration motor 10 is connected to the PCB 32 through the front end 33. The supplied driving power may generate a current flow in the coils 28 through the driving IC 30. At this time, the current may be supplied to the coils 28 by using a signal generated by the Hall sensor built in the driving IC 30. The currents which flow through the coils 28 may form magnetic fields. An attraction force and a repulsive force are simultaneously generated between the magnetic field formed by each of the coils 28 of the stator 50 and the magnetic field formed by the magnet 22 of the rotor 40. By the interaction of these forces, the rotor 40 can be rotated around the shaft 26 of the stator 50. At this time, since the center of gravity of the rotor 40 is eccentric by the eccentric weight 20, the rotor 40 is rotated with vibrating. This eccentric vibrational rotation is transmitted to the cases 12 and 36, and thus the vibration motor 10 as a whole vibrates.

However, the conventional BLDC vibration motor 10 has the following several problems.

First, the conventional BLDC vibration motor 10 has a large structural limitation to make the eccentric weight 20 sufficiently large. In addition, the coupling force between the eccentric weight 20 and a back yoke 16 is weak. Since the eccentric weight 20 is placed in a space between the outer surface of the magnet 22 and the side wall of the upper case 12, a size of the eccentric weight 20 is also limited to the size of the space. Reducing a radius of the magnet 22 is difficult because it causes a reduction in rotational force. Unless the size of the upper case 12 is increased, there is a limit in increasing the weight of the eccentric weight 20 to improve the vibrational force. Consequently, in order to enlarge the eccentric weight 20, it is necessary to increase the size of the upper case 12, which is contrary to the miniaturization trend of the devices using the BLDC vibration motor 10.

The force that keeps the eccentric weight 20 to be fixed as a part of the rotor 40 is a bonding force with the back yoke 16. The upper surface of the eccentric weight 20 is bonded to the back yoke 16. However, the bonding surface is so narrow and thus there may be a limit in obtaining a sufficient bonding force therebetween. A strong centrifugal force may be applied to the eccentric weight 20 during high speed rotation. Thus, a sufficiently large bonding force is required to maintain a stable fixing state by overcoming the centrifugal force even in a continuous use. If not, when an electronic device with the vibration motor 10 is dropped, the eccentric weight 20 may be easily detached from the back yoke 16 due to the drop-impact.

Secondly, since the cogging plates 34 are inserted into the through holes 37 formed in the bracket 36, the cogging plates 34 may be detached from the bracket 36 by an external impact. A neutral zone is formed between the N pole and the S pole in the magnet 22. If a Hall element mounted on the driving IC is located in the neutral zone, an unstartable point is generated and the motor cannot start at that point. A function of the cogging plates 34 installed on the stator is to prevent occurrence of the unstartable point of the motor by making the rotor stop at a correct position so that the N pole or S pole of the magnet 22 of the rotor 40 can be always aligned on the Hall element. Detachment of the cogging plates 34 from the bracket 36 does not prevent the occurrence of the unstartable point.

Thirdly, when the cogging plates 34 are installed in the through holes 37 of the bracket 36, a supporting force that the bracket 36 can provide to the cogging plates 34 may be weakened and thus there is a limit in increasing the areas of the cogging plates 34. When the areas of the cogging plates 34 are small, the attracting forces between the cogging plates 34 and the magnet 22 of the rotor 40 may be also weakened. As a result, a phenomenon that the rotor 40 is projected upward due to the repulsive force (that is, floating of the rotor 40) may be generated at the time of initial start of the motor 10. The floating rotor 40 may generate noises by colliding with the upper case 12. Conventionally, in order to eliminate such noises, there has been a problem that a sliding film or the washer 14 for preventing the noises should be additionally installed.

Fourthly, if the areas of the cogging plates 34 are small, when driving the motor 10 is stopped, it takes a long time for the rotor 40 in the rotation to completely stop its rotation, resulting in a residual vibration. Conversely, if the areas of the cogging plates 34 are excessively large, the unstartable phenomenon may occur. Therefore, it is important to provide the cogging plates 34 having a proper area.

SUMMARY

The present invention is to improve these disadvantages of the conventional BLDC vibration motor.

It is an object of the present invention to provide a BLDC vibration motor capable of improving the eccentric weight mounting structure so as to increase the weight of the eccentric weight, thereby generating a larger amount of vibration than in the prior art.

It is another object of the present invention to provide a BLDC vibration motor having a structure capable of preventing the eccentric weight of the rotor from being detached due to a falling impact by more stable coupling between the eccentric weight and the back yoke despite the increase in weight of the eccentric weight.

It is still another object of the present invention is to provide a BLDC vibration motor in which a mounting structure of the bracket for the cogging plates is improved so as to increase a supporting force by the bracket as well as to increase a stopping speed of the motor so that no residual vibration is left.

It is still another object of the present invention to provide a BLDC vibration motor in which the areas of the cogging plates are optimized so as to prevent a friction between the rotor and the upper case when starting the motor, thereby eliminating the need to provide a separate noise preventing means.

The object of the present invention is not limited to the above-described ones, but may be diversified without departing from the spirit and scope of the present invention.

According to some embodiments of the present invention to achieve the above objects, there is provided a brushless vibration motor including a rotor, a stator, and a case. The rotor of which center of gravity is eccentric and the stator are rotatably coupled with each other to be housed in the case. The rotor generates vibrations while being rotated by an electromagnetic force generated by an interaction between a magnetic field formed by the stator and a magnetic field formed by the rotor. The case provides a plurality of cogging plate mounting grooves. The stator includes a shaft, a cogging plate, a printed circuit board (PCB), and a plurality of coils. The shaft is configured to be fixed upright to the case. The cogging plate includes a plurality of cogging plate pieces which are placed in a plurality of cogging plate mounting grooves and generate a cogging torque to prevent magnetic poles of a permanent magnet of the rotor from being located at an unstartable point. The PCB is fixedly placed on a top surface of a bracket accommodating the cogging plate and configured to generate a driving power necessary for rotating the rotor using an external power source. The plurality of coils are provided on a top surface of the PCB and serve as an electromagnet while the driving power is supplied.

In an exemplary embodiment, the plurality of cogging plate mounting grooves may be connected to each other, and the plurality of cogging plate pieces may be connected to each other in a body so as to have a shape corresponding to the plurality of cogging plate mounting grooves and to be placed in the plurality of cogging plate mounting grooves at a time.

In an exemplary embodiment, a number of the plurality of cogging plate mounting grooves and a number of the plurality of cogging plate pieces may be equal to or half of a number of the magnetic poles of the permanent magnet of the rotor.

In an exemplary embodiment, the bracket may further include a detachment preventing protrusion formed along an upper end of a sidewall of the cogging plate mounting grooves to prevent the cogging plate from being detached from the cogging plate mounting grooves.

In an exemplary embodiment, a thickness of the cogging plate may be substantially equal to a depth of the cogging plate mounting grooves, so that a top surface of the cogging plate placed in the cogging plate mounting grooves is flush with a top surface of the bracket around the cogging plate.

In an exemplary embodiment, the thickness of the cogging plate may be a value in a range of 0.03 mm to 0.05 mm.

In an exemplary embodiment, an outer diameter of a circular region formed by the plurality of cogging plate pieces may be substantially the same as an outer diameter of the permanent magnet of the rotor.

In an exemplary embodiment, the case may include a bracket including a shaft fixing portion protruding from a center thereof and a plurality of cogging plate mounting grooves formed therearound; and a cap-shaped upper case configured to be coupled with the bracket while covering the bracket and provide a space for accommodating the stator and the rotor.

In an exemplary embodiment, the PCB may be installed with a magnetic sensor and a driving IC providing the driving power to the coils. The stator may include two coils. The magnetic sensor may be arranged at a position that halves an angle between air cores of the two coils.

In an exemplary embodiment, the angle between the air cores of the two coils may be equal to a natural number multiple of an angle between any two adjacent poles of the permanent magnet.

In an exemplary embodiment, the permanent magnet may include six magnetic poles, and the cogging plate may include six or three pieces of cogging plates. When viewed from the shaft fixing portion as a center, an angle between a center of each of the coils and a center of a neutral zone of the permanent magnet adjacent thereto may have a value within a range of 11.1 to 15.6 degrees, and an angle between the magnetic sensor and a center of a neutral zone of the permanent magnet adjacent thereto may have a value within a range of 14.4 to 18.9 degrees.

In an exemplary embodiment, the permanent magnet may include four magnetic poles, and the cogging plate may include four or two pieces of cogging plates. When viewed from the shaft fixing portion as a center, an angle between a center of each of the coils and a center of a neutral zone of the permanent magnet adjacent thereto may have a value within a range of 11.7 to 14.0 degrees, and an angle between the magnetic sensor and a center of a neutral zone of the permanent magnet adjacent thereto may have a value within a range of 12.5 to 33.3 degrees.

In an exemplary embodiment, the permanent magnet, the plurality of coils, and the cogging plate may be arranged such that a starting point of a magnetic pole of the permanent magnet is aligned with a starting point of an air core of any one of the coils.

In an exemplary embodiment, the cogging plate may be arranged in a form such that the magnetic poles of the permanent magnet can be aligned on the magnetic sensor when the rotor stops rotating.

In an exemplary embodiment, a lower end portion of the shaft may be press-fitted into a shaft fixing hole provided in the shaft fixing portion, and an upper end portion of the shaft may be inserted into and supported by a groove provided at an inner center of an upper surface of the upper case so as not to slip out, without interposing a separate noise preventing member.

In an exemplary embodiment, the brushless vibration motor may further include a washer coupled with the shaft by insertion, resting on the shaft fixing portion, and rotatably supporting the rotor.

According to embodiments of the present invention to achieve the above objects, the rotor includes a back yoke, a bearing, a ring-shaped permanent magnet, and an eccentric weight. The back yoke is configured to include a circular horizontal yoke including an upper yoke portion and a lower yoke portion which are connected to each other along a boundary of arc shaped step, and a bearing coupling portion provided at a center of the circular horizontal yoke. The bearing is configured to be press-fitted into a through hole of the bearing coupling portion. The ring-shaped permanent magnet is configured to be fixed to the lower yoke portion and including N poles and S poles alternately arranged. The eccentric weight is made of a high specific gravity material and configured to include an upper plate portion and a side wall portion. The upper plate portion of the eccentric weight is sandwiched between the upper yoke portion and the permanent magnet to be bonded to the upper yoke portion and the permanent magnet, respectively. The side wall portion of the eccentric weight extends downward from an outer end of the upper plate portion to surround a part of a side wall of the permanent magnet.

In an exemplary embodiment, the back yoke may further include a sidewall portion of the lower yoke portion extending downward from the outer edge of the lower yoke portion, and a part of a top surface and a part of a side surface of the permanent magnet are bonded to and supported by a bottom surface and a lower yoke side wall portion, respectively.

In an exemplary embodiment, a thickness of an upper plate portion of the eccentric weight may be substantially equal to a height of the boundary of arc shaped step, so that a bottom surface of the upper plate portion of the eccentric weight may be flush with a bottom surface of the lower yoke portion.

In an exemplary embodiment, an upper plate portion of the eccentric weight may be bonded to a bottom surface of the upper yoke portion which corresponds substantially to one half of an area of the horizontal yoke.

In an exemplary embodiment, wherein an upper stopping protrusion and a lower stopping protrusion may be provided at upper and lower ends of a through hole of the bearing coupling portion, respectively, so as to prevent the bearing from being detached from the bearing coupling portion.

In an exemplary embodiment, a top surface cut-out portion and a bottom surface cut-out portion may be formed along circular edges of a top surface and a bottom surface of the bearing, respectively, wherein the top surface cut-out portion and the bottom surface cut-out portion may be stopped by the upper stopping protrusion and the lower stopping protrusion of the bearing coupling portion, respectively.

In an exemplary embodiment, the arc shaped step may be formed in a first semicircular region of the horizontal yoke, along an arc having a radius which is ¼ to ¾ times a radius of the first semicircular region.

According to some embodiments of the present invention to achieve the above objects, there is provided another brushless vibration that also includes a rotor, a stator, and a case. The rotor of which center of gravity is eccentric and the stator are rotatably coupled with each other to be housed in the case. The rotor generates vibrations while being rotated by an electromagnetic force generated by an interaction between a magnetic field formed by the stator and a magnetic field formed by the rotor. The case includes a cap-shaped upper case, and a bracket including a shaft fixing portion protruding from a center thereof and a plurality of cogging plate mounting grooves formed therearound. The stator includes a shaft, a cogging plate, a printed circuit board, a plurality of coils, and a washer. The shaft is configured to be fixed upright to the shaft fixing portion. The cogging plate includes a plurality of cogging plate pieces placed in a plurality of cogging plate mounting grooves, and the plurality of cogging plate pieces generate a cogging torque so that magnetic poles of a permanent magnet of the rotor are not located at an unstartable point. The printed circuit board is fixedly placed on a top surface of the bracket accommodating the cogging plate and configured to generate a driving power necessary for rotating the rotor using an external power source. The plurality of coils are provided on a top surface of the printed circuit board and serve as an electromagnet while the driving power is supplied. The washer is coupled with the shaft by insertion and rests on the shaft fixing portion, so that the washer rotatably supports the rotor. The rotor includes a back yoke, a bearing, a ring-shaped permanent magnet, and an eccentric weight. The back yoke includes a circular horizontal yoke including an upper yoke portion and a lower yoke portion which are connected to each other along a boundary of an arc shaped step, and a bearing coupling portion provided at a center of the circular horizontal yoke. The bearing is configured to be press-fitted into a through hole of the bearing coupling portion. The ring-shaped permanent magnet is configured to be fixed to the lower yoke portion and including N poles and S poles alternately arranged. The eccentric weight is made of a high specific gravity material, and configured to include an upper plate portion sandwiched between the upper yoke portion and the permanent magnet and bonded to the upper yoke portion and the permanent magnet, respectively, and a side wall portion extending downward from an outer end of the upper plate portion and surrounding a part of a side wall of the permanent magnet.

According to the present invention, the eccentric weight of the rotor is arranged between the back yoke and the permanent magnet fixed to the back yoke and this formation can securely fix the upper and lower surfaces of the eccentric weight directly or indirectly to the back yoke. Even if the vibration motor is used for a long time, stable coupling between the eccentric weight and the back yoke can be maintained.

When a smartphone equipped with the vibration motor falls to the floor, a large impact is applied to the vibration motor due to the weight of the smartphone. The large coupling force by the coupling structure between the eccentric weight and the back yoke according to the present invention prevents the eccentric weight from being detached from back yoke even when such a strong external impact is applied.

In addition, the eccentric weight further includes a portion placed between the back yoke and the upper surface of the permanent magnet, in addition to the portion placed on the outer surface of the permanent magnet. Thus, the eccentric weight is heavier than the conventional one, and it is advantageous to further increase the vibration force of the vibration motor. The vibration motor according to the present invention has substantially the same diameter as that of the conventional vibrational motor and a slightly increased thickness compared with the conventional one. Even with increasing thickness, the eccentric weight to be added is brought into contact with almost half of the back yoke area. Thus, with a small thickness, a desired weight increase of the eccentric weight can be obtained.

The bracket and the cogging plate can be punched and attached by a press using a combined mold. In addition, since the cogging plate pieces are connected with each other to be a single body, they can be easily mounted on the bracket at a time. This can reduce the manufacturing costs.

According to the present invention, the portion of the bracket on which the cogging plate is mounted is a groove instead of the through holes, and thus the supporting force for the cogging plate by the bracket can be enhanced. In addition, a plate detachment preventing protrusion is formed at the upper end of the cogging plate receiving groove of the bracket so that the cogging plate can be mounted very firmly on the bracket. Therefore, the coupling of the bracket and the cogging plate can withstand heavy impacts, making it usable for heavy-weight smartphones, alarm devices, etc.

By optimizing an area of the cogging plate, it is possible to suppress rise of the rotor at the time of starting the motor, thereby attenuating the friction noises between the rotor and the upper case. It is also possible to raise the stopping speed of the rotating rotor, resulting in no occurrence of residual vibrations of the motor. The horizontal level of the rotating rotor can be kept uniform. As a result, it is not necessary to provide separate noise preventing means such as a noise preventing film or a washer.

According to the present invention, forming and punching the bracket and the cogging plate can be performed by a common combined mold and press. In addition, since the cogging plate pieces are connected to be a single body, they can be easily mounted on the bracket at a time. This can contribute to the reduction of manufacturing cost.

BRIEF DESCRIPTION OF THE DRAWINGS

These and/or other aspects and advantages of the present general inventive concepts will become apparent and more readily appreciated from the following description of the embodiments, taken in conjunction with the accompanying drawings of which:

FIG. 5 illustrates perspective views showing a state in which a BLDC vibration motor according to the preferred example embodiment of the present invention is disassembled into a case, an assembled rotor, and an assembled stator, and another state in which these are assembled, respectively.

FIG. 15 illustrates an optimal arrangement between coils, a cogging plate, a Hall element, and a permanent magnet when the permanent magnet with four magnetic poles and the cogging plate with four plate pieces are employed.

FIG. 16 illustrates an optimal arrangement between coils, a cogging plate, a Hall element, and a permanent magnet when the permanent magnet with four magnetic poles and the cogging plate with two plate pieces are employed.

DETAILED DESCRIPTION OF THE EMBODIMENTS

Figure 1:
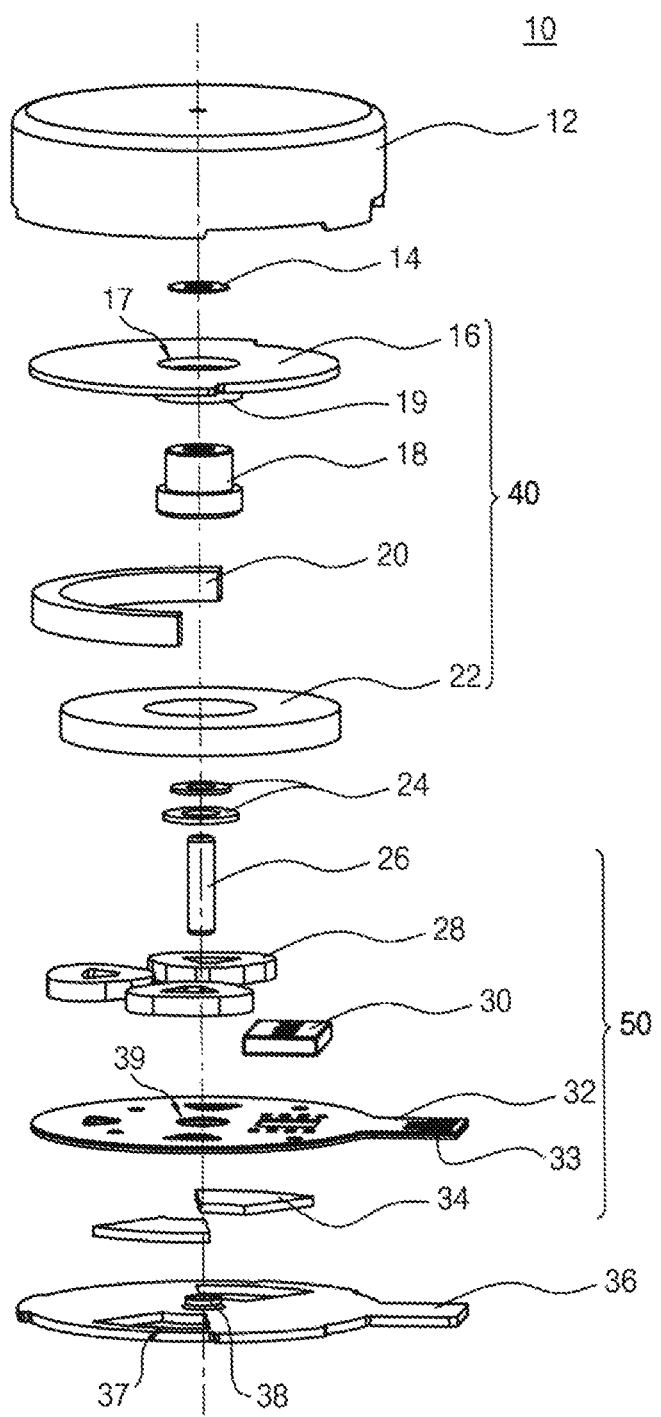
FIG. 1 is an exploded perspective view of a conventional BLDC vibration motor.
Figure 2:
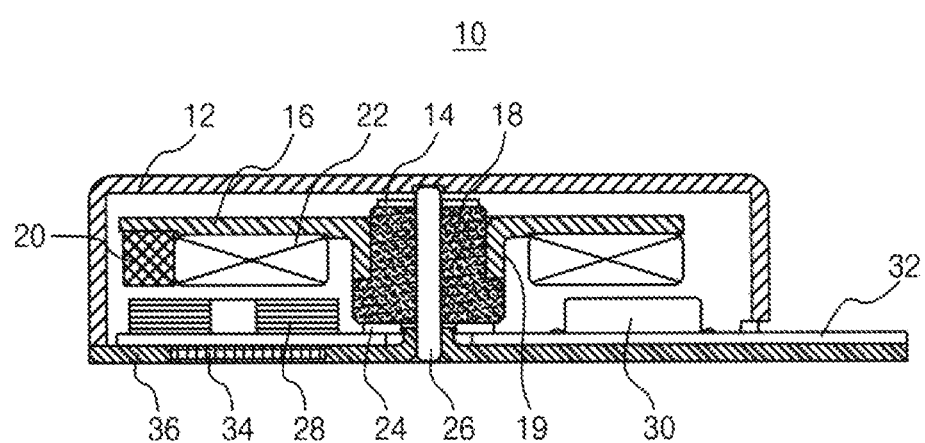
FIG. 2 is a cross-sectional view of the conventional BLDC vibration motor.

Reference will now be made in detail to the embodiments of the present general inventive concepts, examples of which are illustrated in the accompanying drawings, wherein like reference numerals refer to the like elements throughout. The embodiments are described.

For specific embodiments of the invention disclosed herein, specific structural and functional descriptions are set forth for the purpose of describing examples of embodiments of the invention only. The embodiments of the invention may be embodied in various forms, and the present invention should not be construed as limited to the embodiments described below.

The present invention is susceptible of various modifications and various forms, and specific embodiments are illustrated in the drawings and described in detail in the text. It should be understood, however, that the invention is not intended to be limited to the particular forms disclosed, but includes all modifications, equivalents, and alternatives falling within the spirit and scope of the invention.

The terms first, second, etc. may be used to describe various elements, but the elements should not be limited by the terms. The terms may be used for the purpose of distinguishing one component from another. For example, without departing from the scope of the present invention, a first component may be referred to as a second component, and similarly, a second component may also be referred to as a first component.

It is to be understood that when an element is referred to as being "connected" or "coupled" to another element, it should be understood that it may be directly connected or coupled to the other element or there may be any other element in between. On the other hand, when an element is referred to as being "directly connected" or "directly connected" to another element, it should be understood that there are no other elements in between. Other expressions that describe the relationship between the components, such as "between" or "neighboring to" and "directly adjacent to" should be interpreted as well.

The terminology used herein is for the purpose of describing particular embodiments only and is not intended to be limiting of the invention. The singular forms "a," "an," and "the" include plural referents unless the context clearly dictates otherwise. In the present application, it should be understood that the terms "comprises", "have" and the like, are to specify that the presence of stated features, integers, steps, operations, elements, components, or combinations thereof, as a matter of principle, not to preclude the presence or addition.

Unless otherwise defined, all terms used herein, including technical or scientific terms, have the same meaning as commonly understood by one of ordinary skill in the art to which this invention belongs. Terms such as those defined in commonly used dictionaries should be construed as meaning consistent with meaning in the context of the related art and are not to be construed as ideal or overly formal in meaning unless expressly defined in the present application.

Hereinafter, example embodiments of the present invention will be described in detail with reference to the accompanying drawings.

Figure 3:
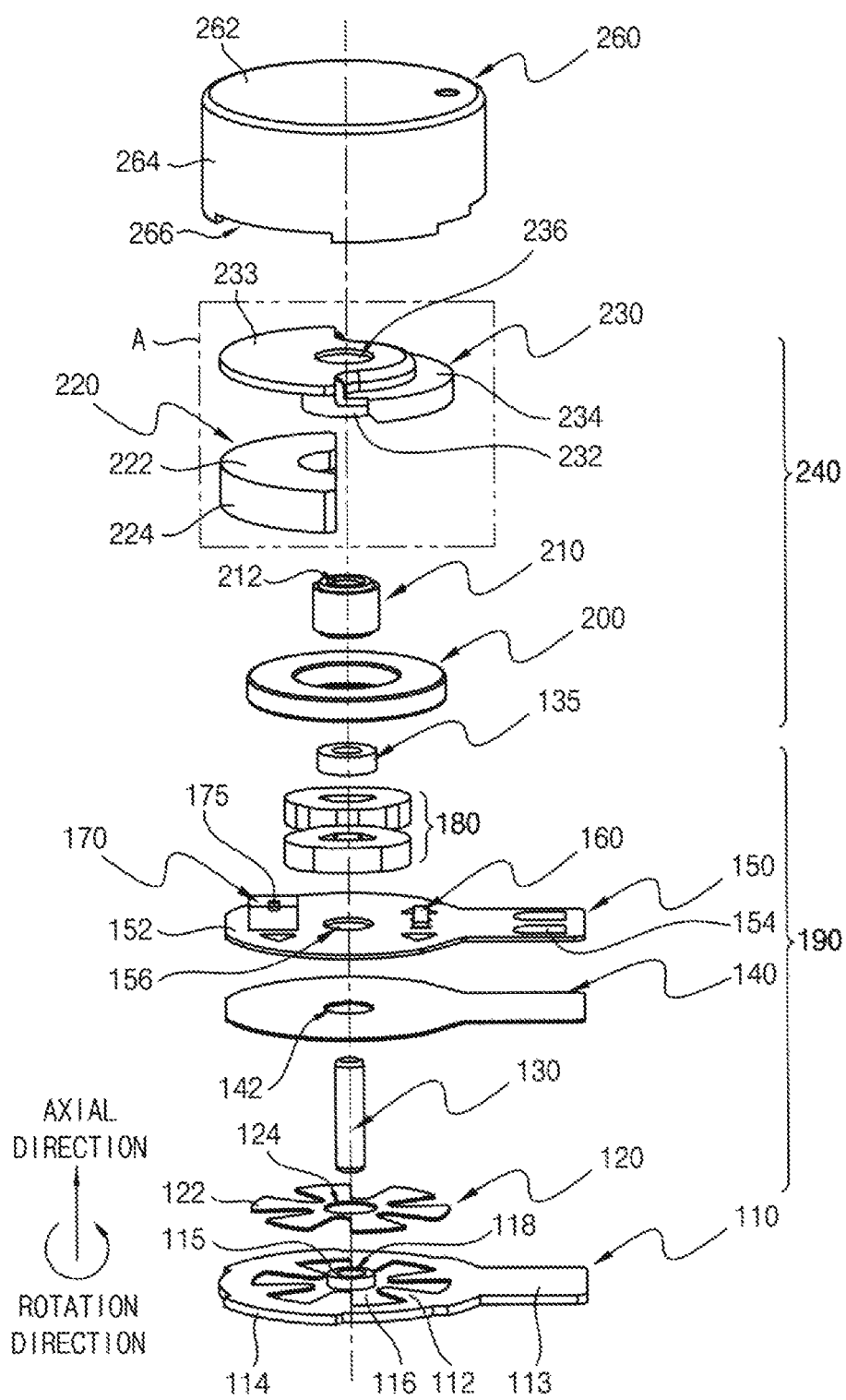
FIG. 3 is an exploded perspective view of a BLDC vibration motor according to an example embodiment of the present invention.
Figure 4:
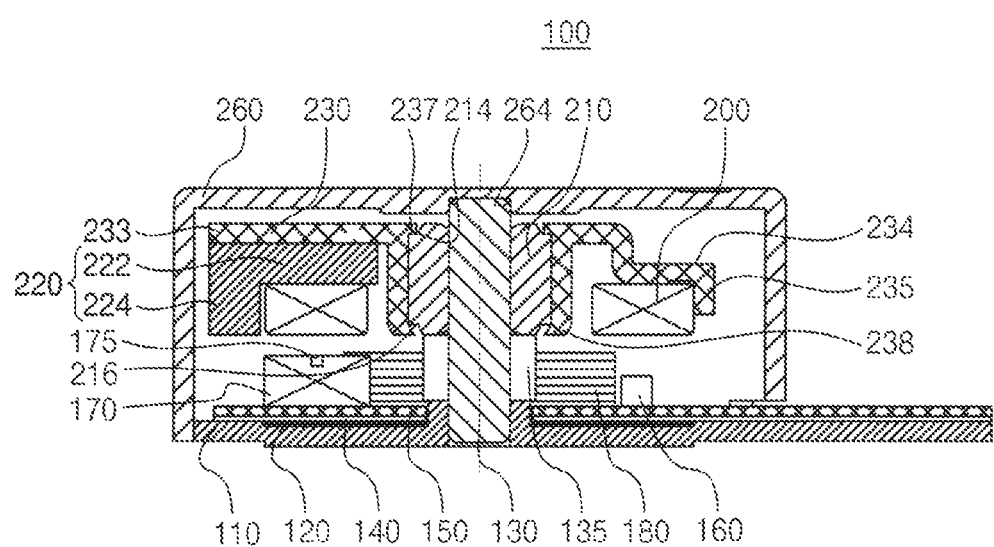
FIG. 4 is a cross-sectional view of the BLDC vibration motor according to the preferred example embodiment of the present invention.

FIG. 3 shows a state in which components of a BLDC vibration motor 100 according to an example embodiment of the present invention are disassembled. FIG. 4 is a cross-sectional view of the BLDC vibration motor 100 assembled with these components.

Referring to FIGS. 3 and 4, the BLDC vibration motor 100 may include a stator 190, a rotor 240, and cases 110 and 260 for receiving and protecting the two assemblies 190 and 240.

An upper case 260 is shaped like a circular cap and its bottom surface is opened. The upper case 260 includes a circular top surface 262 and a cylindrical side wall 264 bent perpendicularly at an edge of the top surface 262 thereof.

A bracket 110 may include a disc portion 112 configured to cover the bottom of the upper case 260, and a protrusion 113 extending in a horizontal direction from one side of the disc portion 112. The bracket 110 is provided as a kind of lower case.

The bracket 110 may be engaged with the upper case 260 while covering the open bottom of the upper case 260. The upper case 260 may be coupled with the bracket 110 by laser welding, soldering, etc. for example, in a state in which the upper case 260 is covered by the disc portion 112 of the bracket 110. One or more latching grooves 266 may be formed at the lower end of the side wall 264 of the upper case 260. Corresponding to the latching grooves 266, one or more latching protrusions 114 may be formed on the edge of the disc portion 112 of the bracket 110. In a state that the upper case 260 is coupled with the bracket 110 by engaging the one or more latching protrusions 114 with the one or more latching grooves 266, a strong coupling between them can be maintained to withstand an external force in a rotating direction.

A stator and a rotor, which will be described later, may be mounted in an inner coin-shaped accommodating space defined by the combination of the upper case 260 and the bracket 110. A shaft fixing portion 115 may be provided at the center of the disk portion 112 of the bracket 110. The shaft fixing portion 115 may have a cylindrical shape protruding upward, and a shaft coupling hole 118 through which a shaft 130 is press-fitted may be formed at the center thereof. A plurality of cogging plate mounting grooves 116 may be formed at equal intervals in a circumferential direction to have a radial arrangement around the shaft fixing portion 115.

Unlike the through hole 37 in the prior art, each of the cogging plate mounting grooves 116 may be formed in a groove structure having a bottom surface sunk by a depth. A cogging plate 120 can be placed in the cogging plate mounting grooves 116. A depth of each of the cogging plate mounting grooves 116 may be substantially the same as a thickness of the cogging plate 120 described below. Also, in order to simplify the installation work of the cogging plate 120, the one or more cogging plate mounting grooves 116 may be formed to communicate with each other. FIG. 3 shows an exemplary arrangement in which six cogging plate mounting grooves 116 are formed to be connected to each other around the shaft fixing hole 115 in a radial arrangement at intervals of 60 degrees. Although six cogging plate mounting grooves 116 are shown in the figure, this is just exemplary and the number of cogging plate mounting grooves 116 may be changed rather than six. The number of cogging plate mounting grooves 116 may be equal to the number of cogging plate pieces 122.

The BLDC vibration motor 100 may include the stator 190 fixedly installed inside the case 110 and 260. The stator 190 may provide a rotating shaft for the rotor 240 and also generate an electromagnetic force capable of rotating a permanent magnet 200 of the rotor 240 by forming an electromagnet with the electric power supplied from an external power source.

The stator 190 may include the cogging plate 120, the shaft 130, a printed circuit board (PCB) 150, a capacitor 160 and a driving IC 170 installed in the PCB 150, a plurality of coils 180, and a washer 135. It is illustrated in the figure that two air-core coils 180 are placed opposite to each other about the shaft 130 to be arranged 180 degrees apart from each other. A larger number of coils 180 may be provided. The driving IC 170 is provided with a magnetic sensor 175 for converting an intensity of the magnetic flux or magnetic field into an electrical signal. For example, a Hall element capable of measuring a direction or strength of a magnetic field using the Hall Effect may be used as the magnetic sensor 175. Of course, other types of magnetic sensors may be used.

During the rotation of the rotor 240, positions of the magnetic poles of the permanent magnet 200 are shifted when viewed from the stator 190. When the coils 180 of the stator 190 corresponding to the magnetic pole positions of the permanent magnet 200 of the rotor 240 are excited, the electromagnetic forces acting between the permanent magnet 200 and the electromagnets of the coils 180 can be maintained in the rotating direction. Thus, the rotor 240 can continue to rotate in the one rotating direction.

If the magnetic field centers of the coils 180 of the stator 190 are aligned with the magnetic field centers of the permanent magnet 200 of the rotor 240 while the rotor 240 is in a stop state, a starting torque of the rotor 240 is weak and the rotor 240 may fail to start its rotation. That is, when the magnetic sensor 175 sensing the magnetic poles of the permanent magnet 200 are located in the neutral zones between the N pole and the S pole of the permanent magnet 200, the poles of the permanent magnet 200 cannot be detected and thus unstartable point of the rotor 240 may occur.

In order not to allow the rotor 240 to be located at the unstartable point, the cogging plate 120 to generate a cogging torque or detent torque may be provided in the bracket 110. The cogging plate 120 prevents the neutral zone of the permanent magnet 200 from overlapping with the magnetic sensor 175.

The cogging plate 120 provided as a cogging torque generating means may be made of a magnetic material. The cogging plate 120 may have a shape oppositely corresponding to the shape of the cogging plate mounting grooves 116 and thus be press-fitted into the cogging plate mounting grooves 116. For example, as illustrated in FIG. 3, six cogging plate pieces 122 are connected to each other to have a radial arrangement of 60 degrees apart, and a through hole 124 into which the shaft fixing portion 115 may be inserted is formed at the center thereof.

A thickness of the cogging plate 120 may be substantially the same as the depth of the cogging plate mounting grooves 116. The top surface of the cogging plate 120 placed in the cogging plate mounting grooves 116 may be flush with the top surface of the bracket 110 around the cogging plate 120 to form flat planes of the same level. According to an embodiment of the present invention, a thickness of the cogging plate 120 may be set within a range of 0.03 mm to 0.05 mm. If the thickness is thicker than the range, the vibration motor 100 may fail to start. On the other hand, when the thickness is thinner than the range, the rotor 240 may be pushed upward due to a repulsive force of the rotor 240 during an initial start of the vibration motor 100, and some noises may be generated by colliding with the upper case 260.

The area of the cogging plate 120 may be also important. According to an exemplary embodiment of the present invention, it is preferable that an outer diameter of a circular region formed by the cogging plate 120 is substantially the same as an outer diameter of the permanent magnet 200 of the rotor 240. Thus, the cogging plate 120 can form a strong attractive force with the permanent magnet 200 as much as possible.

It is preferable that the number of the cogging plate pieces 122 of the cogging plate 120 corresponds to the number of poles of the permanent magnet 200 to be described later on a one-to-one basis. In an exemplary embodiment of the present invention, the cogging plate 120 may have six plate pieces so as to correspond to bi-directional six poles of the permanent magnet 200. In this way, the attractive force between the cogging plate 120 and the permanent magnet 200 can be increased, which can suppress rising of the rotor 240 at the time of starting the vibration motor 100. Therefore, it is not necessary to provide the sliding film or the washer 14 installed in the vibration motor 10 according to the prior art to prevent occurrence of the frictional noises caused by the rising of the rotor at the time of initial start-up. In another example, the number of the cogging plate pieces 122 may be half of the number of magnetic poles of the permanent magnet 200.

The shaft 130 may have a cylindrical shape with a smooth surface. The lower end portion of the shaft 130 may be press-fitted into the shaft fixing portion 115 to be fixedly coupled to the bracket 110, and the upper end portion of the shaft 130 may be inserted into a shaft groove 268 formed at the center of the top surface 262 of the upper case 260.

The PCB 150 may include a printed circuit unit 152 and a terminal portion 154. The printed circuit unit 152 may have a shape that can cover the disc portion 112 of the bracket 110 and the cogging plate pieces 122 of the cogging plate 120, and have a through hole formed at the center thereof. The terminal portion 154 may be horizontally extended from an edge of the printed circuit unit 152 so that it can connect an external power source to the printed circuit unit 152. The shape of the PCB 150 may be substantially similar to that of the bracket 110. The printed circuit unit 152 may be provided with electric elements such as the driving IC 170 and the capacitor 160 for protecting the driving IC 170 from being damaged by an overvoltage, and wiring for electrically connecting them. The driving IC 170 may generate a driving power using an electrical power supplied from an external power source, and control supply of the driving power to the coils 180 to control driving of the rotor 240. The PCB 150 may be made of a flexible PCB.

The plurality of coils 180 may be mounted on the top surface of the PCB 150 so as to face the permanent magnet 200 and may be connected to the driving IC 170 to receive the driving power therefrom.

The PCB 150 may be adhered to the top surface of the bracket 110 on which the cogging plate pieces 122 are placed via a bonding means 140 such as an adhesive agent or an adhesive tape. FIG. 3 shows an example in which a double-sided tape is used as the bonding means 140. The double-sided tape and the PCB 150 may be formed with through holes 156 and 142 through which the shaft 130 can pass.

The ring-shaped washer 135 may be coupled with the shaft 130 and rest on the shaft fixing portion 115 to rotatably support the bottom surface of a bearing 210 of the rotor 240. The shaft fixing portion 115 may protrude higher than the printed circuit unit 152 of the PCB 150 so that the washer 135 does not come into direct contact with the printed circuit unit 152. The washer 135 mounted on the top surface of the shaft fixing portion 115 may support the rotor in such a state that the washer 135 protrudes higher than other components of the stator 190 such as the coils 180, the driving IC 170, etc.

Next, the BLDC vibration motor 100 may also include a rotor 240 rotatably coupled to the stator 190 within the case. The rotor 240 may include a back yoke 230, an eccentric weight 220, the bearing 210, and the permanent magnet 200 which are integrally and rigidly coupled to each other.

Figure 7:
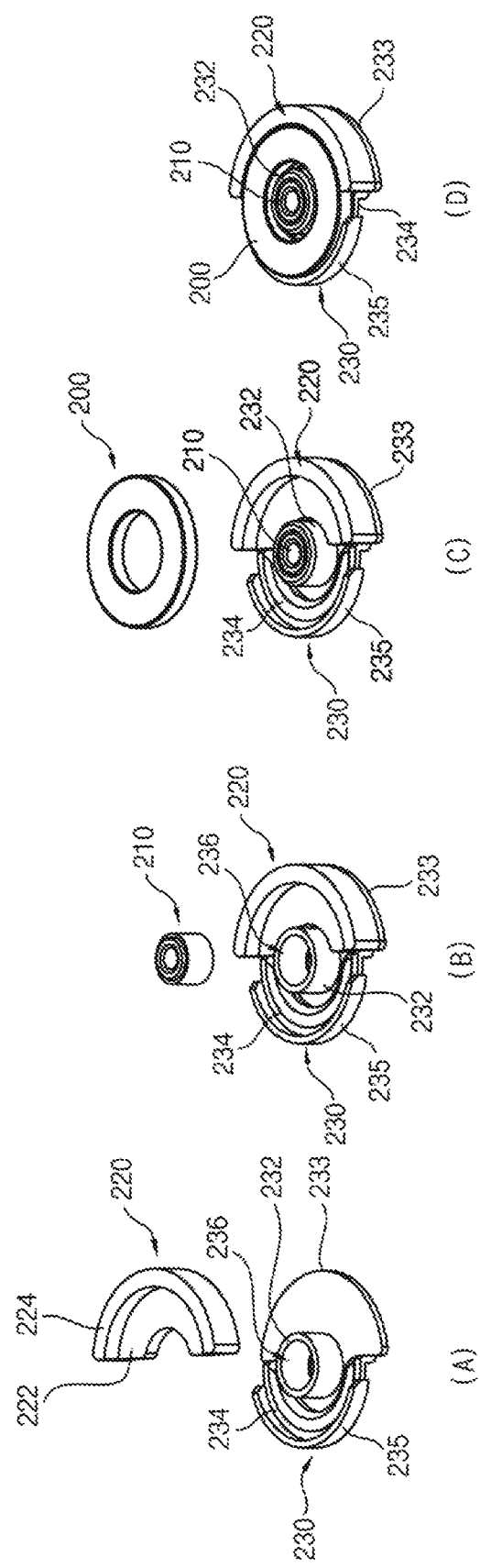
FIG. 7 shows a procedure of assembling the rotor according to a preferred example embodiment of the present invention.

FIGS. 3, 4 and 7 show a structure of the back yoke 230. The back yoke 230 may be positioned at the top of the rotor 240 so as to prevent the magnetic flux produced by the permanent magnet 200 from leaking upward and to couple the components constituting the rotor 240 into one body. The back yoke 230 may be preferably made of a magnetic material to effectively shield magnetic leakage flux.

The back yoke 230 may include a bearing coupling portion 232 which provides a cylindrical through hole in the vertical direction and a horizontal stepped-yoke 233 and 234 coupled to the upper end of the bearing coupling portion 232 and extending in the horizontal direction. The horizontal stepped-yoke 233 and 234 may form an approximately circular shape when viewed from an axial direction (vertical direction) of the vibration motor 100. A stepped interface may be formed along a predetermined circular arc in one half-circle region of the horizontal stepped-yoke 233 and 234. The horizontal stepped-yoke 233 and 234 may include an upper yoke portion 233 and a lower yoke portion 234 which are connected to each other to form a step as a boundary. The step may be formed along an arc having a radius which is ¼ to ¾ times a radius of the semicircular area. The arc may be semicircular. A height of the step may be substantially equal to a thickness of an upper plate portion 222 of the eccentric weight 220 to be described later.

The lower yoke portion 234 may further include a lower yoke sidewall portion 235 extending a predetermined length in a downward axial direction at an edge thereof (see FIG. 7(A)). The lower yoke side wall portion 235 may be joined to the side surface of the permanent magnet 200 by welding or the like. Thus, the permanent magnet 200 can be more strongly bonded to the back yoke 230 (Detailed descriptions will be given below). If the lower yoke side wall portion 235 is too short, a bonding force between the lower yoke side wall portion 235 and the side surface of the permanent magnet 200 may be insufficient. On the other hand, if the lower yoke side wall portion 235 is too long, the weight of the eccentric weight 220 is canceled to thereby weaken the eccentricity. Therefore, it is preferable that the lower yoke side wall portion 235 has a vertical length capable of covering ¼ to ¾ of the side surface of the permanent magnet 200.

A through hole 236 may be provided at the center of the bearing coupling portion 232. The central axis of the through hole 236 may be parallel to the axial direction of the shaft 130. The bearing 210 may be a cylindrical shape. A through hole 212 may be formed at the center of the bearing 210 in the axial direction. A top surface cut-out portion 214 may be formed along the circular edge of the top surface of the bearing 210 and a bottom surface cut-out portion 216 may be formed around a circular edge of the bottom surface of the bearing 210. The bearing 210 may be press-fitted into the through hole 236 of the bearing coupling portion 232 and coupled to the back yoke 230 so as to rotate integrally with the back yoke 230.

An upper stopping protrusion 237 and a lower stopping protrusion 238 may be provided at upper and lower ends of the bearing coupling portion 232 so as to prevent the bearing 210, which is press-fitted into the bearing coupling portion 232, from escaping vertically from the bearing coupling portion 232. The upper stopping protrusion 237 may be formed, for example, by a press processing. The upper stopping protrusion 237 thus formed may have a circular shape to cover the top surface cut-out portion 214. The lower stopping protrusion 238 may be formed by the press-fitting the bearing 210 into the bearing coupling portion 232 and then curling the lower end of the bearing coupling portion 232 inward. The lower stopping protrusion 238 may also have a circular shape to cover the bottom surface cut-out portion 216. The top surface cut-out portion 214 of the bearing 210 is caught by the upper stopping protrusion 237 to prevent the bearing 210 from being raised. Further, the bottom surface cut-out portion 216 may be caught by the lower stopping protrusion 238, so that the bearing 210 cannot move downward. The smaller the area of the bottom surface of the bearing 210 contacting the washer 135, the more frictional loss can be reduced. The bottom surface cut-out portion 216 may be also advantageous in this respect.

The eccentric weight 220 may include the upper plate portion 222 and a side wall portion 224. The upper plate portion 222 may be joined to an inner bottom surface of the upper yoke portion 233 while surrounding a part of a side of the bearing coupling portion 232. The side wall portion 224 may extend downward from the outer edge portion of the upper plate portion 222. The eccentric weight 220 may be made of a high specific gravity material such as tungsten, alloy mainly composed of tungsten, or the like. The side wall portion 224 may be in a shape of an angled bar bent in an arc shape. The upper plate portion 222 and the upper yoke portion 233 may be joined by various known welding techniques or adhesives, for example. The upper plate portion 222 of the eccentric weight 220 may be formed in a pseudo-horseshoe shape that is joined to approximately half of the area of the circular back yoke 230 to maximize a magnitude of eccentricity. That is, it may be advantageous in maximizing an weight of the eccentric weight 220 and a bonding force between the eccentric weight 220 and the upper yoke portion 233 that the upper plate portion 222 of the eccentric weight 220 is made so big as to cover the majority of the bottom surface of the upper yoke portion 233.

The bottom surface of the upper plate portion 222 and the inner bottom surface of the lower yoke portion 234 may have substantially the same level for stable installation of the permanent magnet 200. For this, a thickness of the upper plate portion 222, a size of the step of the lower yoke portion 234, a thickness of the lower yoke portion 234, and the like should be properly determined.

The permanent magnet 200 may be ring-shaped. A plurality of N poles and S poles which may be alternately arranged in the ring shaped permanent magnet 200. The permanent magnet 200 may have a flat surface in order to be firmly joined with the eccentric weight 220. The permanent magnet 200 may have one or more neutral zones 205 without polarity between adjacent N pole and S pole of the permanent magnet 200 (see FIG. 11). A width of each of the neutral zone 205 may be set within a range of approximately 0.2 to 0.6 mm. The bearing coupling portion 232 may be inserted into the permanent magnet 200 so that a part of the top surface of the permanent magnet 200 can be coupled with the bottom surface of the upper plate portion 222 of the eccentric weight 220 and the remaining portion of the top surface of the permanent magnet 200 can be coupled with the inner bottom surface of the lower yoke portion 234. The mentioned couplings may be performed by, for example, a known welding method or a bonding method using an adhesive. Thereby, the permanent magnet 200 can be strongly adhered to the back yoke 230.

The outer surface of the permanent magnet 200 may be coupled with the lower yoke side wall portion 235. This coupling can strengthen a bonding force between the permanent magnet 200 and the back yoke 230. A bonding means such as an adhesive may be added between the inner surface of the side wall portion 224 of the eccentric weight 220 and the outer surface of the permanent magnet 200 to further strengthen the bonding force therebetween.

As described above, the eccentric weight 220 according to example embodiments of the present invention further includes the upper plate portion 222 when compared to the eccentric weight 20 according to the prior art. Thus, it is possible to make the eccentric weight 220 much heavier and thus generate an enhanced eccentric vibration force. In addition, not only the top surface but also the side surface of the permanent magnet 200 is directly or indirectly bonded to the back yoke 230. Therefore the permanent magnet 200 can further strengthen the binding force with respect to the back yoke 230. This also enhances the bonding force between the eccentric weight 220 and the back yoke 230.

In addition, the eccentric weight 20 according to the prior art is bonded to the back yoke 16 by its top surface only which is relatively narrow. In contrast, the upper plate portion 222 of the eccentric weight 220 is joined to the upper yoke portion 233 by a large area, and the upper plate portion 222 is sandwiched between and bonded to the upper yoke portion 233 and the permanent magnet 200 (strongly coupled to the back yoke 230). Therefore, the eccentric weight 220 according to the example embodiment of the present invention can be bonded to the back yoke 230 by a much stronger force when compared to the prior art. Therefore the eccentric weight 220 can be maintained in a stable state without being detached from the rotor even when a strong external impact is applied.

The structure of the rotor 240 described above is just one exemplary embodiment. Any rotor having a structure which is different from the structure of the rotor 240 as described above may be applied to the present invention as long as it is rotatably coupled with the stator 190 described above.

FIG. 5 shows two states before and after the assembled rotor 240 and the assembled stator 190 are housed in the case 260 and 110, respectively. As described above, since the eccentric weight 220, the permanent magnet 200, and the bearing 210 are firmly coupled to the back yoke 230 to form a single body and the eccentric weight 220 is relatively heavier, the rotor 240 having an eccentric rotation center can be obtained. The bearing 210 of the rotor 240 is coupled with the shaft 130 of the stator 190 through the through hole 236 so that the bearing 210 can rotate about the shaft 130. The bottom surface of the bearing 210 is placed on the washer 135. The washer 135 and the bearing 210 may have a very smooth surface so that the frictional loss during rotation can be minimized. An electromagnetic force that causes the rotor 240 to rotate in one direction is generated by the interaction between the magnetic poles of the electromagnet formed by the coils 180 and the magnetic poles of the permanent magnet 200, thereby rotating the rotor 240. Since the rotor 240 is eccentric at the time of rotating around the shaft 130 as a rotation axis, the rotor 240 generates vibrations during its rotation.

Figure 6:
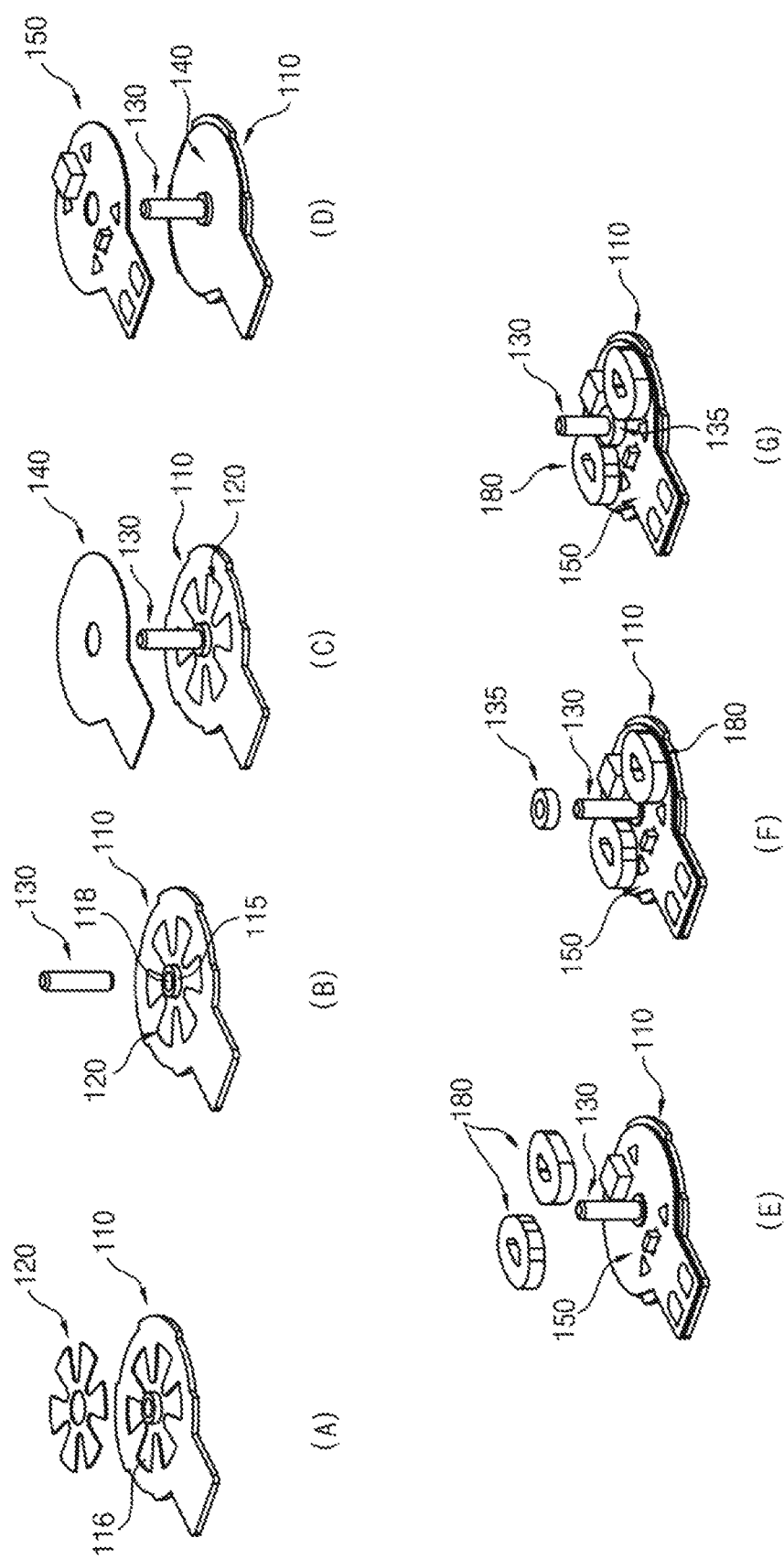
FIG. 6 shows a procedure of assembling the stator according to a preferred example embodiment of the present invention.
Figure 8:
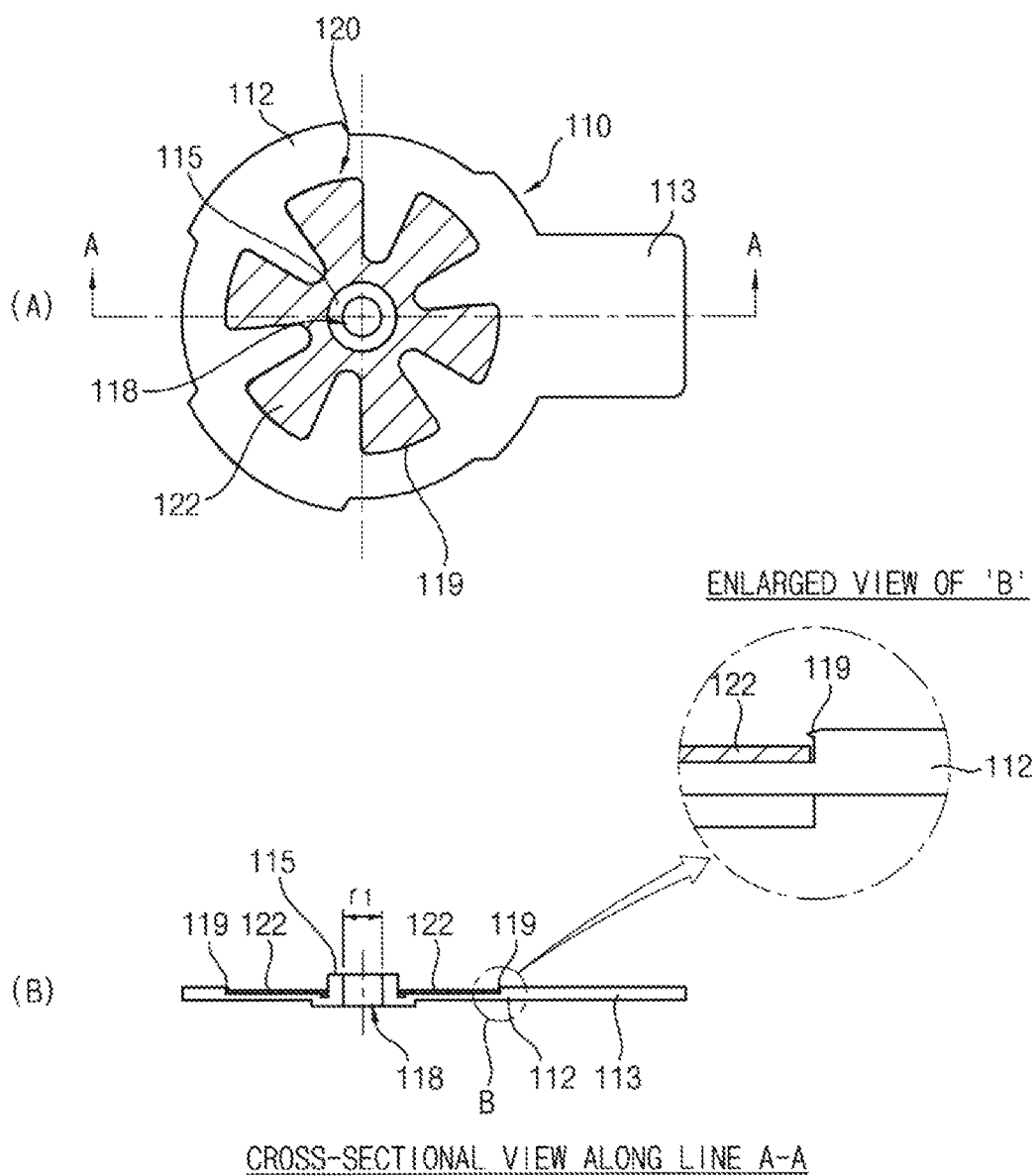
FIGS. 8 to 10 are views for describing a method of placing a cogging plate on a bracket according to a preferred example embodiment of the present invention.
Figure 9:
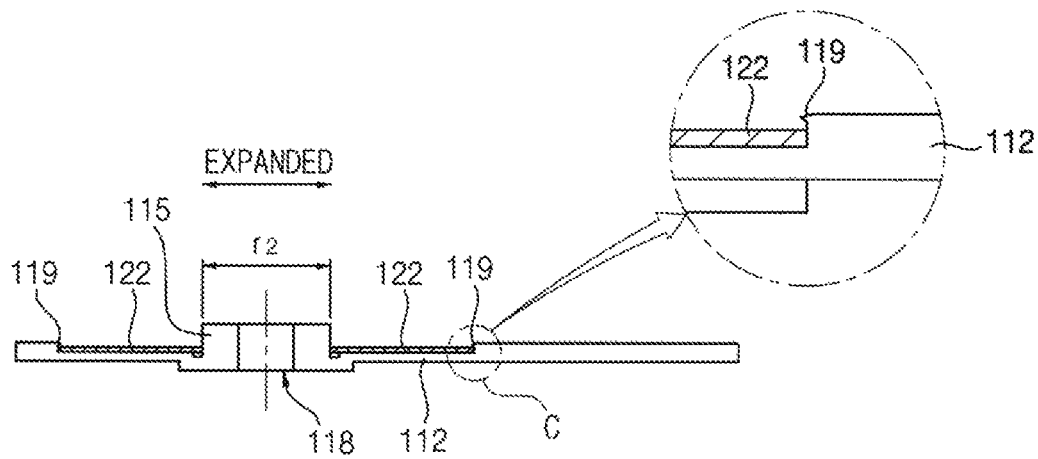
Figure 10:
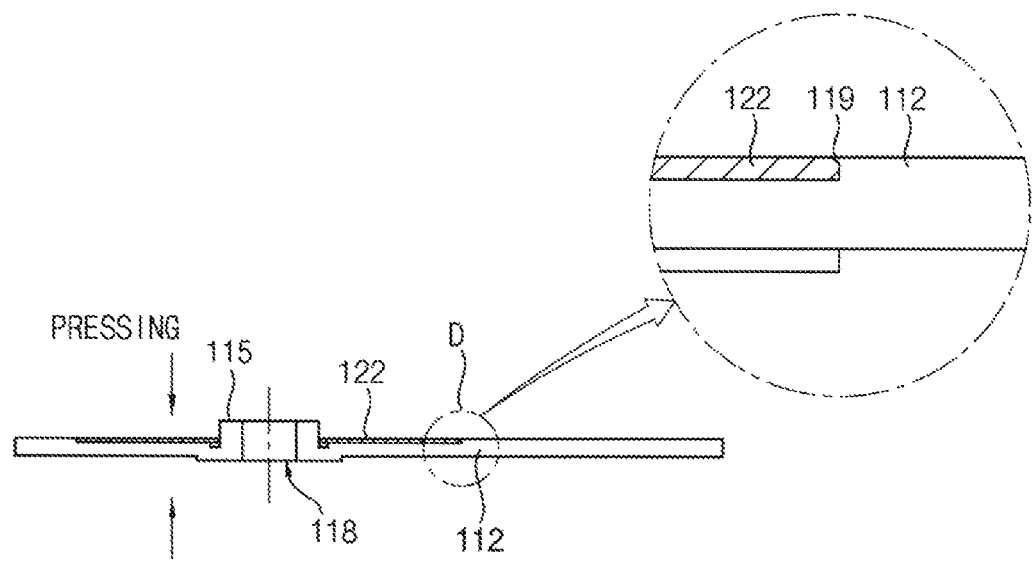

FIG. 6 shows a procedure of assembling the stator 190 to the bracket 110. FIG. 7 shows a procedure of assembling the components of the rotor 240. FIGS. 8 to 10 illustrate more specifically the procedure of assembling the cogging plate 120 to the bracket 110 and the processing method.

In order to assemble the stator 190, the bracket 110 and the cogging plate 120 may be prepared. For the manufacture of the stator 190, the bracket 110 may be prepared to protect the components of the vibration motor 100 and fix the shaft 130 and the cogging plate 120.

In the bracket 36 according to the prior art, the shaft fixing portion 38 is formed at the center of the bracket 36, and formed with the shaft coupling hole at its center so that the shaft 26 can be fixed to the shaft fixing portion 38 in the vertical direction. In addition, the through holes 37 are formed in the disc portion of the bracket 36 around the shaft fixing portion 38 so that the cogging plates 34 can be assembled. This structure may cause inconvenience in assembling works in that the cogging plates should be assembled to the bracket 36 separately and cannot but lead to an increase in manufacturing costs. Further, forming the through holes 37 in the bracket 36 may cause the supporting force by the bracket 36 to be weakened naturally. When an external impact is applied, the bracket 36 as well as the parts in the case may be damaged and deformed easily. In the result, damage such as loosening or detachment of the cogging plates 34 from the bracket 36 may occur. Furthermore, stopping speed of the vibration motor 10 may be also slowed down, which is a weak point to be applied to, for example, a smart touch phone which places importance on the reaction speed.

According to the embodiment of the present invention in order to solve these problems, the bracket 110 is formed with the cogging plate mounting grooves 116 and the cogging plate 120 is placed thereon. FIGS. 8-11 schematically illustrate this process.

In the bracket 110 may be made of a material that is approximately two times thicker than the thickness of the cogging plate 120, such as a plate of non-magnetic SUS 304 stainless steel. The material plate may be cut into a shape of the bracket 110 by a pressing machine, for example, and the shaft fixing portion 115 may be processed so as to be formed with the shaft coupling hole 118 at the center of the cut-out material plate.

The cogging plate mounting grooves 116 of the bracket 110 may be formed by pressure-forging with a pressing machine. The cogging plate 120 may be also made by cutting the material plate using the pressing machine. The cogging plate 120 may be placed onto the cogging plate mounting grooves 116 (see FIG. 8).

To couple the cogging plate 120 with the bracket 110, a combined mold method may be used. That is, the bracket 110 and the cogging plate 120 may be directly engaged with each other by a punching process using two molds. By doing so, the cost of installing the cogging plate 120 may be reduced. Further, for the enhancement of the supporting force by the bracket 110, the bracket 110 is not formed with any separate through hole through which the cogging plate 120 can be installed. Instead, the thicknesses of material plates for the bracket 110 and the cogging plate 120 may be made different, and the material plate for the bracket 110 may be forged by the forging process to form the cogging plate mounting grooves 116. So, the cogging plate 120 may be forcedly assembled into the cogging plate mounting grooves 116 of which depth is substantially the same as the thickness thinned by the forging process. This processing work may be done with two molds in the same press, that is, a complex mold. Thus, it may not be necessary to fix the plate separately, resulting in manufacturing cost-down and a stable product quality.

After the cogging plate 120 is placed onto the cogging plate mounting grooves 116, a plate detachment preventing protrusion 119 projecting horizontally inward may be formed along the top-edge of the side wall of each of the cogging plate mounting grooves 116. The plate detachment preventing protrusion 119 may be formed along the entire top-edge of the cogging plate mounting grooves 116 by applying a pressing force to the top surface of the bracket 110 in the direction of the arrows in FIG. 10. In addition, an outer diameter of the shaft fixing portion 115 of the bracket 110 may be extended (i.e., to be $r_2 > r_1$) by the forging process so that the shaft fixing portion 115 can be forcibly brought into a tight contact with the side wall of the through hole 124 of the cogging plate 120 and the cogging plate 120 cannot freely move (see FIG. 9).

After this, the top and bottom surfaces of the bracket 110 may be slightly pressed at a time to make the cogging plate 120 to be tightly coupled to the bracket 110 while reducing the projecting height of the bottom surface of the bracket 110. And, the cogging plate 120 may be caught by the plate detachment preventing protrusion 119 of the bracket 110, and the top surface of the cogging plate 120 may come to be flush with the top surface of the bracket 110 (See FIG. 10). Thus, the cogging plate 120 can be fixed to the bracket 110 more firmly.

This coupling structure of the cogging plate 120 and the bracket 110 may provide several advantages as follows. Since the cogging plate 120 is integrally formed with a plurality of the cogging plate pieces, the cogging plate 120 can be easily positioned and fixed to the bracket 110 at a time. When the cogging plate 120 and the bracket 110 are assembled in this manner, the cogging plate 120 is structurally very stable and the cogging plate 120 will not be detached from the bracket 110 even when a strong external impact is applied thereto. The cogging plate 120 may include a large number of cogging plates corresponding to the number of magnetic poles of the permanent magnet 200, which is advantageous to enhance the attracting force between the cogging plate 120 and the permanent magnet 200.

After the assembly of the bracket 110 and the cogging plate 120 is prepared as above, the shaft 130 may be forcibly press-fitted into the shaft coupling hole 118 formed in the bracket 110 (refer to (B) and (C) of FIG. 6).

Then, the PCB 150 may be fixed to the top surface of the bracket 110 and the cogging plate 120 using, for example, the double-sided tape 140 (see (C) and (D) of FIG. 6).

The coils 180 may be attached to the PCB 150 using an adhesive and soldered to the wiring of the printed circuit unit 152 of the PCB 150 (see (E) and (F) of FIG. 6). Thus, an external power can be transferred through the terminal portion 154 to the driving IC 170 which supplies a driving power to the coils 180.

Next, an assembling process of the eccentric rotor 240 is illustrated in FIG. 7.

Referring to FIG. 7, firstly the back yoke 230 may be processed to have the structure as described above. In particular, the upper stopping protrusion 237 may be formed at the upper end of the bearing coupling portion 232 to prevent the bearing 210 from coming off.

Next, the eccentric weight 220 may be coupled to the prepared back yoke 230. The eccentric weight 220 may be placed on the bottom surface of the upper yoke portion 233 and fixed thereto by a bonding work such as laser welding (see (A) and (B) of FIG. 7).

Then, the cylindrical bearing 210 may be forcibly press-fitted into the coupling hole provided in the bearing coupling portion 232 of the back yoke 230. In addition, after the bearing 210 is fixed to the bearing coupling portion 232 by the press-fitting, the lower end of the bearing coupling portion 232 may be curled to form the lower stopping protrusion 238 in order to prevent the bearing 210 from coming out by an external impact. The upper stopping protrusion 237 and the lower stopping protrusion 238 may prevent the bearing 210 from escaping upward or downward (see (B) and (C) of FIG. 7).

After the bearing is press-fitted, the permanent magnet 200 may be fixed to the eccentric weight 220 and the lower yoke portion 234. That is, the permanent magnet 200 may be bonded to the bottom surface of the upper plate portion 222 of the eccentric weight 220, and the bottom surface and the inner surface of the lower yoke side wall portion 235 of the lower yoke portion 234. The bonding can be performed by welding or an adhesive, for example (Refer to (C) and (D) of FIG. 7). Thus, the permanent magnet 200 may be adhered to the bottom surface and the lower yoke side wall portion 235. Through this process, the assembled rotor 240 can be obtained.

The stator 190 and the rotor 240 prepared as above may be assembled by inserting the shaft 130 of the stator 190 into the bearing 210 of the rotor 240 as shown in FIG. 5. The bearing 210 of the rotor 240 is rotatably engaged with the shaft 130 of the stator 190, and the bottom surface of the bearing 210 is rest on the washer 135 of the stator 190. Since the bearing 210 rotates with respect to the fixed shaft 130 and the washer 135, it is desirable that these components have smooth surfaces with very low frictional coefficients in order to minimize movement loss due to friction.

Finally, the upper case 260 may be placed over the assembly of the stator 190 and the rotor 240. The upper case 260 and the bracket 110 may be coupled to each other by laser welding, for example. Through this process, the assembled vibration motor 100 can be obtained (See FIG. 5).

The assembling procedure described above is exemplary, and the assembling sequence may be changed unless it is an inevitable precedence relationship.

Figure 11:
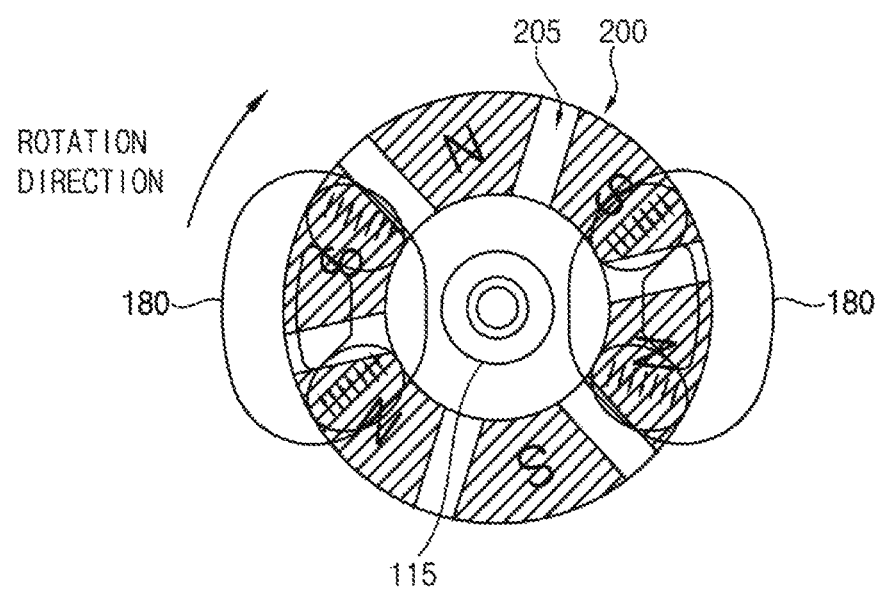
FIG. 11 is a view to describe a principle that a permanent magnet is rotated by interactions between the magnetic fields of the permanent magnet and the magnetic fields generated by coils.

When an external power is supplied through the terminal portion 154 of the bracket 110, the driving IC 170 supplies the driving power to the coils 180. By this, the two coils 180 become an electromagnet while forming magnetic fields. In FIG. 11, when a current is supplied to the two coils 180 so that the upper polarities of the left and right coils 180 about the shaft fixing portion 115 become the S pole and the N pole, respectively, the permanent magnet 200 receives a rotational force in the direction of the arrow shown in FIG. 11. As a result, the permanent magnet 200 is forced to rotate clockwise. When the permanent magnet 200 rotates clockwise by 60 degrees, the upper polarities of the left and right coils 180 about the shaft fixing portion 115 are changed to be the N pole and S pole, respectively, and the permanent magnet 200 receives a rotational force in the same direction as before (i.e., clockwise). The first magnetic fields formed by the two coils 180 interact with the second magnetic fields formed by the permanent magnet 200 of the rotor 240 to generate forces of attraction and repulsion by which the rotor 240 can rotate continuously in the same direction. The rotor 240 can rotate at a high speed around the shaft 130 of the stator 190 by the rotational force.

When supply of the driving power to the coils 180 is stopped, the rotor 240 will stop its rotation. In the state where the rotor 240 is stopped, any adjacent N pole and S pole (or S pole and N pole) of the permanent magnet 200 are positioned in the left side region and the right side region of a cogging plate piece 122, respectively. If the magnetic sensor 175 for detecting the magnetic pole of the permanent magnet 200 is positioned in a neutral zone 205 of the permanent magnet 200, the vibration motor 100 cannot be started. The cogging plate 120 of the stator 190 works to prevent the vibration motor 100 from being situated in the unstartable state. For this, when the rotor 240 stops its rotation, it is required that the N pole or S pole, instead of the neutral zone, of the permanent magnet 200 of the rotor 240 should be accurately aligned with the magnetic sensor 175 of the driving IC 170. An example embodiment for this purpose will be described in more detail.

Let's consider a case where the permanent magnet 200 with bidirectional six poles and two coils 180 are used for generating the electromagnetic force. The six poles are arranged at intervals of 60 degrees along the circumferential direction. The two coils 180 of the stator 190 are placed opposite to each other about the shaft fixing portion 115. The magnetic sensor 175 mounted on the driving IC 170 may be placed at a position where the angle of 180 degrees between the two coils 180 is bisected, that is, the angle between the magnetic sensor 175 and each of the two coils 180 is 90 degrees around the shaft fixing portion 115 (see FIGS. 12 and 13).

Figure 12:
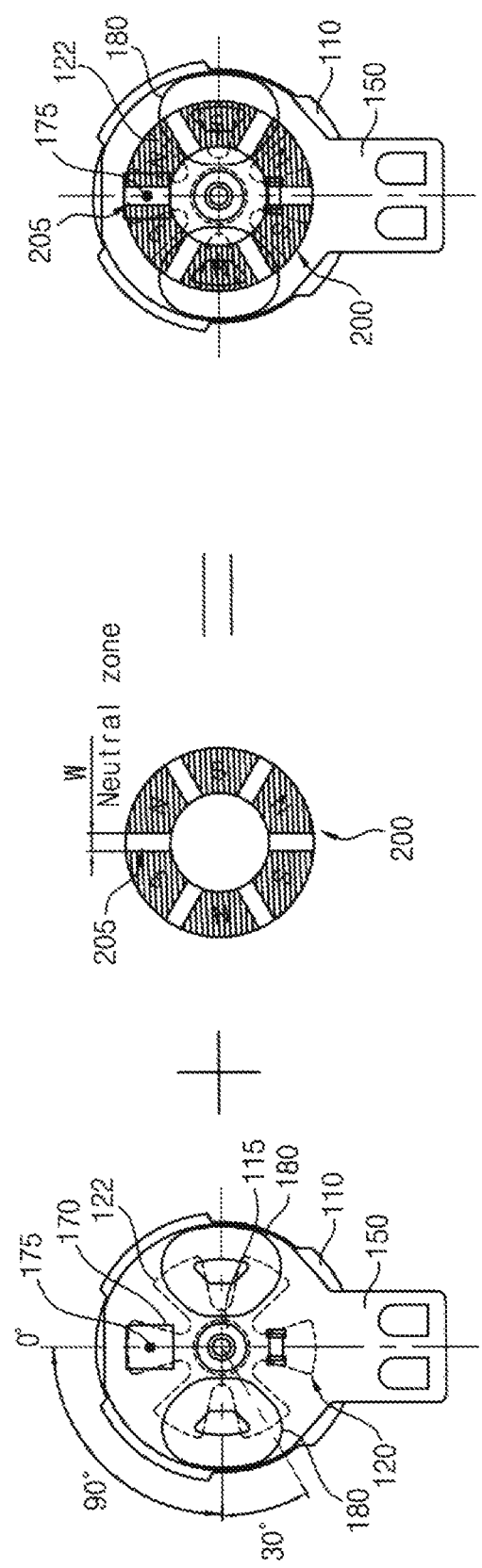
FIG. 12 illustrates an arrangement of coils, the cogging plate, a Hall element, and the permanent magnet which cause the rotor in a stationary state to be placed at an unstartable point when the permanent magnet with six magnetic poles and the cogging plate with six plate pieces are employed.

FIG. 12 illustrates a case where the rotor 240 of the vibration motor 100 is positioned at the unstartable point. As shown in FIG. 12, when the angle between the center of each of the coils 180 and the center of a cogging plate piece 122 adjacent thereto is 30 degrees, the angle between the center of the magnetic sensor 175 of the driving IC 170 and the center of the cogging plate piece 122 closest thereto becomes zero degree. This causes a problem that the magnetic sensor 175 overlaps the neutral zone 205 of the permanent magnet 200, thereby making the vibration motor 100 to be placed at the unstartable point.

Figure 13:
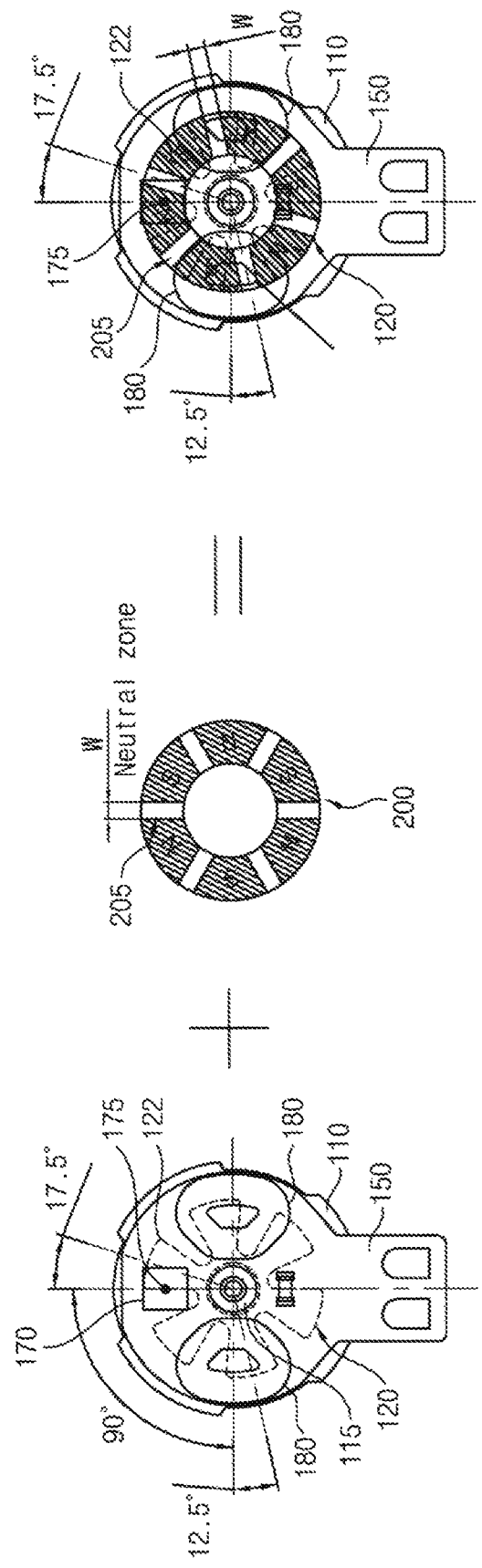
FIG. 13 illustrates an optimal arrangement between coils, a cogging plate, a Hall element, and a permanent magnet when the permanent magnet with six magnetic poles and the cogging plate with six plate pieces are employed.

FIG. 13 shows a design example for avoiding the vibration motor 100 from being put in the state. According to the design example, when a width of the neutral zone 205 of the permanent magnet 200 is 4 mm, the angle between the center of each of the coils 180 and the center of the cogging plate piece 122 closest thereto may be 12.5 degrees. In this case, the angle between the magnetic sensor 175 and the center of the neutral zone 205 of the permanent magnet 200 may be 17.5 degrees. Here, the 17.5 degrees is the value obtained by subtracting 12.5 degrees from 30 degrees, which is one half of the angle (60 degrees) of any one magnet pole. According to this design, the magnetic sensor 175 can be placed outside the neutral zone 205 of the permanent magnet 200 and be aligned with any one magnetic pole of the permanent magnet 200 so that it can sense the magnetic pole. At this time, the center of the cogging plate 122 is positioned outside the neutral zone 205 of the permanent magnet 200, and a start point of the magnetic pole is aligned with a start point of the air core of each of the coils 180. In the result, at the time of starting the vibration motor 100, the electromagnetic forces between the permanent magnet 200 and the coils 180 are maximized and a large starting torque can be obtained.

If the area of the cogging plate 120 is narrow, the attracting force between the cogging plate 120 and the permanent magnet 200 of the rotor 240 is weakened, which may cause the rotor 240 to protrude upward and collide with the upper case 260 to generate noises due to a repulsive force during the starting of the vibration motor 100. Conventionally, to eliminate the noise, a sliding film or a washer for noise attenuation has to be installed. In the present invention, the number of the cogging plate pieces 122 is the same as the number (for example, six) of the poles of the permanent magnet 200 so as to prevent the noise problem as described above without installing the sliding film or the washer separately. Like this, a sufficiently large number of the cogging plate pieces 122 can allow the rotor 240 to rotate horizontally as much as possible around the shaft 130, which is advantageous in extending a life of the vibration motor 100 and preventing the frictional noises.

Figure 14:
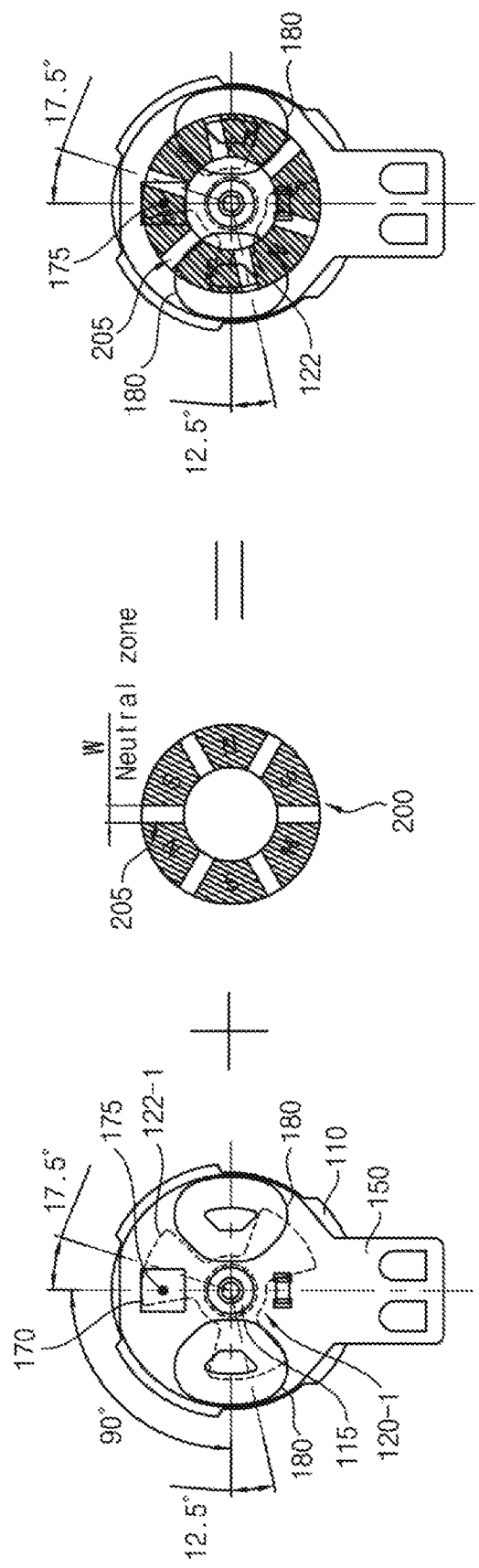
FIG. 14 illustrates an optimal arrangement between coils, a cogging plate, a Hall element, and a permanent magnet when the permanent magnet with six magnetic poles and the cogging plate with three plate pieces are employed.

As shown in FIG. 14, the number of the cogging plate pieces 122-1 of the cogging plate 120-1 may be three, which is half of the number of poles of the permanent magnet 200. The three cogging plate pieces 122-1 are connected to each other at intervals of 120 degrees. In order to prevent the permanent magnet 200 from being located at the unstartable point, the magnetic sensor 175 needs to be designed so as to be positioned outside of the neutral zone 205 of the permanent magnet 200 to detect the magnetic poles of the permanent magnet 200. As described above, the number of the cogging plate pieces 122-1 may be determined half of the number of magnetic poles. In this case, when the angle between the center of each of the two coils 180 and the center of the neutral zone 205 of the permanent magnet 200 and the angle between the center of the magnetic sensor 175 and the center of the cogging plate piece 122-1 are 12.5 degrees and 17.5 degrees, respectively, as shown in FIG. 13, a large starting torque can be obtained.

In the embodiments shown in FIGS. 13 and 14, the angle between the air cores of the two coils 180 may be the same value as the natural number multiple of the angle between two adjacent magnetic poles of the permanent magnet 200. Since the permanent magnet 200 has six magnetic poles and the angle between any two adjacent poles is 60 degrees, the angle between the air cores of the two coils 180 may be 60 degrees or 120 degrees in addition to the illustrated 180 degrees.

Meanwhile, as mentioned above, the number of six of magnetic poles is an exemplary one. The permanent magnet 200-1 having four magnetic poles as illustrated in FIGS. 15 and 16 may be employed.

FIG. 15 illustrates a case where the number of plate pieces 122-2 of the cogging plate 120-2 is four, which is the same as the number of magnetic poles. Being connected to each other, the four pieces of cogging plate 120-2 have an interval of 90 degrees with each other. Since the angle between any two magnetic poles of the four magnetic poles of the permanent magnet 200-1 is 90 degrees, the angle between the air cores of the two coils 180 may be the same angle as the natural number multiple of 90 degrees, that is, 90 degrees or 180 degrees. In FIGS. 15 and 16, the two coils 180 are arranged adjacent to each other such that the angle between the two air cores of the two coils 180 is 90 degrees. The magnetic sensor 175 may be positioned opposite the center between the two coils 180. In order to obtain a large starting torque in this arrangement, the angle between the center of each of the two coils 180 and the center of the neutral zone 205 of the permanent magnet 200 adjacent thereto may be 12.5 degrees and the angle between the magnetic sensor 175 and the center of the neutral zone 205 adjacent thereto may be 32.5 degrees. Here, the 32.5 degrees is a value obtained by subtracting 12.5 degrees from 45 degrees which is half of an angle of any one magnetic pole.

FIG. 16 illustrates a case in which the number of cogging plate pieces 122-2 of the cogging plate 120-2 is two which is half the number of the magnetic poles. The two coils 180 and the magnetic sensor 175 may be arranged as shown in FIG. 15. The two cogging plates 120-2 are connected to each other with an interval of 180 degrees from each other. In this arrangement, when the angle between the center of each of the two coils 180 and the neutral zone 205 of the permanent magnet 200 adjacent thereto is 12.5 degrees, and the angle between the magnetic sensor 175 and the center of the neutral zone 205 adjacent thereto is 32.5 degrees, a large starting torque of the vibration motor 10 can be obtained.

Meanwhile, as mentioned above, the size 4 mm of the width w of the neutral zone 205 of the permanent magnet 200 is an exemplary value. The width may be determined within a range of 0.2 mm to 0.6 mm, preferably within a range of 0.2 mm to 0.5 mm. The width w of the neutral zone 205 may be designed to be 0.2 mm in the arrangement as shown in FIG. 13 or 14 employing the permanent magnet 200 having six magnetic poles. In this case, when the angle between the center of each of the two coils 180 and the center of the neutral zone 205 of the permanent magnet 200 adjacent thereto is 15.6 degrees and the angle between the magnetic sensor 175 and the center of the neutral zone 205 of the permanent magnet 200 adjacent thereto is 14.4 degrees, a large starting torque can be obtained. When the width w of the neutral zone 205 is designed to be 0.5 mm, the angle between the center of each of the two coils 180 and the center of the neutral zone 205 is 11.1 degrees and the angle between the magnetic sensor 175 and the center of the neutral zone 205 of the permanent magnet 200 adjacent thereto is 18.9 degrees, a large starting torque can be obtained.

The width w of the neutral zone 205 may be determined within a range of 0.2 to 0.5 mm in the arrangement as shown in FIG. 15 or 16 employing the permanent magnet 200-1 having four magnetic poles. In this case, when the angle between the center of each of the two coils 180 and the center of the neutral zone 205 has a value within a range of 11.1 to 14.0 degrees, and the angle between the magnetic sensor 175 and the center of the neutral zone 205 of the permanent magnet 200 adjacent thereto has a value within a range of 12.5 to 33.3 degrees, a large starting torque can be obtained.

The stator 190 described above is merely exemplary. If a stator has a configuration capable of providing a fixed rotation axis with respect to the rotor 240 and generating an electromagnetic force to rotate the permanent magnet 200 using the electromagnets of the coils, the stator may be used in combination with the rotor 240 according to the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention can be applied to the manufacture of a BLDC vibrational motor applicable to various small electronic devices such as mobile phones, portable game machines, earphones, wearable devices and the like.

Although a few embodiments of the present general inventive concepts have been shown and described, it will be appreciated by those skilled in the art that changes may be made in these embodiments without departing from the principles and spirit of the general inventive concepts, the scope of which is defined in the appended claims and their equivalents.

What is claimed is:

1. A brushless vibration motor, comprising:
    a rotor;
    a stator; and
    a case including a bracket configured to have a shaft fixing portion protruding from a center thereof and a plurality of cogging plate mounting grooves formed therearound; and a cap-shaped upper case configured to be coupled with the bracket while covering the bracket and provide a space for accommodating the stator and the rotor,
    wherein the rotor, of which center of gravity is eccentric, and the stator are rotatably coupled with each other to be housed in the case, and the rotor generating vibrations while being rotated by an electromagnetic force generated by an interaction between a magnetic field formed by the stator and a magnetic field formed by the rotor,
    wherein the stator comprises a shaft configured to be fixed upright to the shaft fixing portion; a cogging plate including a plurality of cogging plate pieces which are placed in the plurality of cogging plate mounting grooves and generate a cogging torque to prevent magnetic poles of a permanent magnet of the rotor from being located at an unstartable point; a printed circuit board fixedly placed on a top surface of a bracket accommodating the cogging plate and configured to generate a driving power necessary for rotating the rotor using an external power source; and a plurality of coils which are provided on a top surface of the printed circuit board and serve as an electromagnet while the driving power is supplied, and
    wherein each of a number of the plurality of cogging plate mounting grooves and a number of the plurality of cogging plate pieces is equal to or half of a number of the magnetic poles of a permanent magnet of the rotor.

2. The brushless vibration motor of claim 1, wherein the plurality of cogging plate mounting grooves are connected to each other, and the plurality of cogging plate pieces are connected to each other in a body so as to have a shape corresponding to the plurality of cogging plate mounting grooves and to be placed in the plurality of cogging plate mounting grooves at a time.

3. The brushless vibration motor of claim 1, wherein the bracket further includes a detachment preventing protrusion formed along an upper end of a sidewall of the cogging plate mounting grooves to prevent the cogging plate from being detached from the cogging plate mounting grooves.

4. The brushless vibration motor of claim 1, wherein a thickness of the cogging plate is substantially equal to a depth of the cogging plate mounting grooves, so that a top surface of the cogging plate placed in the cogging plate mounting grooves is flush with a top surface of the bracket around the cogging plate.

5. The brushless vibration motor of claim 1, wherein the thickness of the cogging plate is a value in a range of 0.03 mm to 0.05 mm.

6. The brushless vibration motor of claim 1, wherein an outer diameter of a circular region formed by the plurality of cogging plate pieces is substantially the same as an outer diameter of the permanent magnet of the rotor.

7. The brushless vibration motor of claim 1, wherein the PCB is installed with a magnetic sensor and a driving IC providing the driving power to the coils, the stator including two coils, and the magnetic sensor being placed at a position that halves an angle between air cores of the two coils.

8. The brushless vibration motor of claim 7, wherein the angle between the air cores of the two coils is equal to a natural number multiple of an angle between any two adjacent poles of the permanent magnet.

9. The brushless vibration motor of claim 8, wherein the permanent magnet includes six magnetic poles, and the cogging plate includes six or three pieces of cogging plates, and wherein when viewed from the shaft fixing portion as a center, an angle between a center of each of the coils and a center of a neutral zone of the permanent magnet adjacent thereto has a value within a range of 11.1 to 15.6 degrees, and an angle between the magnetic sensor and a center of a neutral zone of the permanent magnet adjacent thereto may have a value within a range of 14.4 to 18.9 degrees.

10. The brushless vibration motor of claim 8, wherein the permanent magnet includes four magnetic poles, and the cogging plate includes four or two pieces of cogging plates, and wherein when viewed from the shaft fixing portion as a center, an angle between a center of each of the coils and a center of a neutral zone of the permanent magnet adjacent thereto has a value within a range of 11.7 to 14.0 degrees, and an angle between the magnetic sensor and a center of a neutral zone of the permanent magnet adjacent thereto has a value within a range of 12.5 to 33.3 degrees.

11. The brushless vibration motor of claim 7, wherein the cogging plate is arranged in a form such that the magnetic poles of the permanent magnet can be aligned on the magnetic sensor when the rotor stops rotating.

12. The brushless vibration motor of claim 1, wherein a lower end portion of the shaft is press-fitted into a shaft fixing hole provided in the shaft fixing portion, and an upper end portion of the shaft is inserted into and supported by a groove provided at an inner center of an upper surface of the upper case so as not to slip out, without interposing a separate noise preventing member.

13. The brushless vibration motor of claim 1, further comprising a washer coupled with the shaft by insertion, resting on the shaft fixing portion, and rotatably supporting the rotor.

14. A brushless vibration motor, comprising:
a rotor;
a stator; and
a case configured to house the rotor and the stator,
wherein the rotor of which center of gravity is eccentric and the stator are rotatably coupled with each other to be housed in the case, the rotor generating vibrations while being rotated by an electromagnetic force generated by an interaction between a magnetic field formed by the stator and a magnetic field formed by the rotor,
wherein the rotor includes a back yoke including a circular horizontal yoke including an upper yoke portion and a lower yoke portion which are connected to each other along a boundary of an arc shaped step, and a bearing coupling portion provided at a center of the circular horizontal yoke; a bearing configured to be press-fitted into a through hole of the bearing coupling portion; a ring-shaped permanent magnet configured to be fixed to the lower yoke portion and including N poles and S poles alternately arranged; and an eccentric weight, made of a high specific gravity material, configured to include an upper plate portion sandwiched between the upper yoke portion and the permanent magnet and bonded to the upper yoke portion and the permanent magnet, respectively, and a side wall portion extending downward from an outer end of the upper plate portion and surrounding a part of a side wall of the permanent magnet, and
wherein a thickness of an upper plate portion of the eccentric weight is substantially equal to a height of the boundary of the arc shaped step, so that a bottom surface of the upper plate portion of the eccentric weight is flush with a bottom surface of the lower yoke portion.

15. The brushless vibration motor of claim 14, wherein the back yoke further includes a lower yoke side wall portion extending downward from the outer edge of the lower yoke portion, and a part of a top surface and a part of a side surface of the permanent magnet are bonded to and supported by a bottom surface and the lower yoke side wall portion, respectively.

16. The brushless vibration motor of claim 14, wherein an upper plate portion of the eccentric weight is bonded to a bottom surface of the upper yoke portion which corresponds substantially to one half of an area of the horizontal yoke.

17. The brushless vibration motor of claim 14, wherein an upper stopping protrusion and a lower stopping protrusion are provided at upper and lower ends of a through hole of the bearing coupling portion, respectively, so as to prevent the bearing from being detached from the bearing coupling portion.

18. The brushless vibration motor of claim 17, wherein a top surface cut-out portion and a bottom surface cut-out portion are formed along circular edges of a top surface and a bottom surface of the bearing, respectively, so that the top surface cut-out portion and the bottom surface cut-out portion are stopped by the upper stopping protrusion and the lower stopping protrusion of the bearing coupling portion, respectively.

19. The brushless vibration motor of claim 14, wherein the arc shaped step is formed in a first semicircular region of the circular horizontal yoke, along an arc having a radius which is ¼ to ¾ times a radius of the first semicircular region.

20. A brushless vibration motor, comprising:
a rotor;
a stator; and
a case configured to house the rotor and the stator,
wherein the rotor of which center of gravity is eccentric and the stator are rotatably coupled with each other to be housed in the case, the rotor generating vibrations while being rotated by an electromagnetic force generated by an interaction between a magnetic field formed by the stator and a magnetic field formed by the rotor,
wherein the case includes a bracket including a shaft fixing portion protruding from a center thereof and a plurality of cogging plate mounting grooves formed therearound, and a cap-shaped upper case;
wherein the stator includes a shaft configured to be fixed upright to the shaft fixing portion; a cogging plate including a plurality of cogging plate pieces placed in the plurality of cogging plate mounting grooves, the plurality of cogging plate pieces generating a cogging torque so that magnetic poles of a permanent magnet of the rotor are not located at an unstartable point; a printed circuit board fixedly placed on a top surface of the bracket accommodating the cogging plate and configured to generate a driving power necessary for rotating the rotor using an external power source; a plurality of coils provided on a top surface of the printed circuit board and serving as an electromagnet while the driving power is supplied; and a washer coupled with the shaft by insertion, resting on the shaft fixing portion, and rotatably supporting the rotor,
wherein the rotor includes a back yoke including a circular horizontal yoke including an upper yoke portion and a lower yoke portion which are connected to each other along a boundary of arc shaped step, and a bearing coupling portion provided at the center of the circular horizontal yoke; a bearing configured to be press-fitted into a through hole of the bearing coupling portion; the permanent magnet being a ring-shaped permanent magnet configured to be fixed to the lower yoke portion and having N poles and S poles alternately arranged; and an eccentric weight, made of a high specific gravity material, configured to include an upper plate portion sandwiched between the upper yoke portion and the permanent magnet and bonded to the upper yoke portion and the permanent magnet, respectively, and a side wall portion extending downward from an outer end of the upper plate portion and surrounding a part of a side wall of the permanent magnet, and
wherein each of a number of the plurality of cogging plate mounting grooves and a number of the plurality of cogging plate pieces is equal to or half of a number of the magnetic poles of a permanent magnet of the rotor.

* * * * *